(12) United States Patent
Beshai

(10) Patent No.: US 7,366,412 B2
(45) Date of Patent: Apr. 29, 2008

(54) HYBRID FINE-COARSE CARRIER SWITCHING

(75) Inventor: Maged E. Beshai, Stittsville (CA)

(73) Assignee: Nortel Networks Limited (CA)

( * ) Notice: Subject to any disclaimer, the term of this patent is extended or adjusted under 35 U.S.C. 154(b) by 1146 days.

(21) Appl. No.: 10/290,314

(22) Filed: Nov. 8, 2002

(65) Prior Publication Data

US 2004/0091264 A1    May 13, 2004

(51) Int. Cl.
 *H04J 14/00* (2006.01)
(52) U.S. Cl. ....................................................... 398/49
(58) Field of Classification Search ............. 398/47–51
 See application file for complete search history.

(56) References Cited

U.S. PATENT DOCUMENTS 6,069,720 A * 5/2000 Cotter et al. .................. 398/1
6,570,872 B1   5/2003 Beshai
6,724,997 B2 * 4/2004 Oksanen ..................... 398/150
7,012,895 B1 * 3/2006 Mir ............................. 370/235

OTHER PUBLICATIONS

U.S. Appl. No. 10/054,509, Maged E. Beshai.
U.S. Appl. No. 09/624,079, Maged E. Beshai.

* cited by examiner

*Primary Examiner*—Shi K Li
(74) *Attorney, Agent, or Firm*—Anderson Gorecki & Manaras

(57) ABSTRACT

An optical shell node is provided with an ability to perform time switching on signals received from subtending edge nodes and channel switching on signals received from other shell nodes and destined for the subtending edge nodes. The signals received from the subtending edge nodes may be aggregated into signals that are channel switched by optical core nodes or by other shell nodes toward destination edge nodes. A resultant network formed of these shell nodes along with channel-switching core nodes and subtending-upon-shell-node edge nodes is capable of expansion beyond a continental scale, can support large numbers of edge nodes and has a higher bit rate capacity than known optical network structures.

17 Claims, 29 Drawing Sheets

HYBRID FINE-COARSE CARRIER SWITCHING

FIELD OF THE INVENTION

The present invention relates to communications networks and, in particular, to hybrid fine-coarse carrier switching in such networks.

BACKGROUND

In a telecommunication connection between a transmitter and a receiver, a baseband signal modulates a carrier signal to result in a modulated carrier signal, the transmitter sends the modulated carrier signal along a transmission medium to a receiver, then the receiver demodulates the modulated carrier signal to retrieve the baseband signal. A multiplex of several baseband signals may modulate the carrier signal.

Due to modulation, the frequency spectrum of the carrier signal spreads over a frequency band, the width of which has traditionally been called "bandwidth". The bandwidth is measured in cycles per second (or Hertz). However, when the baseband signals modulating the carrier represent digital data, the total bit rate that can be accommodated within the bandwidth is also, colloquially, referenced as a bandwidth and measured in bits per second.

A transmission medium may accommodate several modulated carrier signals, each carrying a multiplex of baseband signals, and the portion of the frequency spectrum accommodated by the transmission medium allocated for each modulated carrier is called a channel. In other words, the transmission medium may carry several channels, each channel occupying a portion of the total frequency spectrum of the transmission medium. Naturally, the channels occupy non-overlapping portions of the spectrum. In a fiber-optic link, the frequency band allocated to each channel is often associated with the wavelength of the carrier signal and called a "wavelength channel" or, simply, a wavelength.

If the transmission medium traverses a switching node, where the baseband signals within the bandwidth of a modulated carrier signal are to be directed to different destinations, the switching node must first demodulate the modulated carrier signal, retrieve the individual baseband signals, and direct each of the retrieved baseband signals to an output port of the switching node that is associated with the destination of the particular baseband signal. Then, a multiplex of baseband signals received at each output port modulates a carrier signal leading to a subsequent switch. The process where the baseband signals within a single carrier are detected and routed individually, is essentially a baseband switching process performed by a baseband switch. A baseband switch offers fine-granularity and, with the current state of the art, is based on an electronic switching fabric with electronic data buffers provided at the input ports and output ports.

If the carrier signal shares the transmission medium with several other carrier signals, forming a multiplex of carrier signals, each carrier signal carrying a multiplex of baseband signals, a "coarse" switch may separate the individual modulated carrier signals and direct each modulated carrier signal to a designated transmission medium. A coarse switch switching entire modulated carrier signals is hereinafter called a carrier switch.

The task of retrieving baseband signals is not required in a carrier switch and, therefore, a carrier switch is less complex than a baseband switch for the same capacity. However, a carrier switch, being a very coarse switch, may force a given modulated carrier signal to traverse multiple carrier switches (hops). In contrast, baseband signals from several baseband switches may be aggregated at an intermediate baseband switch then switched to their respective destinations. Comparatively then, a network made up of carrier switches would appear to be not as efficient as a network made up of baseband switches.

Fine granularity in a carrier switch may be realized using a large number of carrier signals, each carrier signal modulated by a baseband signal of a narrow bandwidth. For example, instead of using a multiplex of 16 carriers, each modulated at 10 Gigabits per second, a multiplex of 16,000 carriers, each modulated at 10 Megabits per second, may be used. The modulated 16,000 carrier signals may then be spatially switched to separate the individual carrier signals which would be demodulated only at the receiving end switch. Exchanging carrier signals among 64 such carrier multiplexes would be a challenging task. Another way of realizing fine granularity is to use time-division multiplexing (TDM), where a carrier signal can be time sliced into time-limited signals organized in a TDM frame of 1,024 time slots for example. Thus, a carrier modulated at 10 Gb/s, can be divided into 1,024 units of about 10 Mb/s each. Exchanging carrier signals among 64 multiplexes of 16 carriers each requires a fast space switch having 1,024 input ports and 1,024 output ports. A fast modular space switch of this capacity is realizable. However, aligning the TDM frames at the 64 input ports is not assured without the use of input buffers. With the current state of the art, a carrier switch can not include input buffers. There is no practical facility to store carrier signals and retrieve them in any desired order. This precludes time switching without some means for coordinating the switching functions at each carrier switch with the switching functions at the preceding and succeeding switches.

In applicant's U.S. patent application Ser. No. 09/286, 431, filed on Apr. 6, 1999, and titled "Self-Configuring Distributed Switch", a method of aligning signals at the input ports of a bufferless switch receiving carrier signals from a plurality of edge nodes is disclosed. The method requires that each edge node be provided with random-access buffers. Time switching requires TDM-frame alignment at the input ports. Hence, time switching can not be used for fine-granularity carrier switching if a connection requires traversing two or more carrier switches. The time-alignment process, also called "time locking" is further extended in applicant's U.S. patent application Ser. No. 10/054,509, filed on Nov. 13, 2001 and titled "Time-Coordination in a Burst-Switching Network".

Clearly, an ideal compact and efficient network would be based on maximizing the use of fine-granularity carrier switching in order to minimize the number of traversed switch nodes per connection. As discussed above, fine-granularity carrier switching is only feasible in a first carrier switch in a path from a source of a carrier modulated with a signal to a destination, or sink, for the signal. Consequently, fine-granularity carrier switching is used where only one switch node is to be traversed and coarse-granularity carrier switching is used where more than one switch node is be traversed. There is a need for a flexible network that combines both fine and coarse carrier-switching granularity.

SUMMARY

A network including electronic edge nodes that perform fine carrier switching and shell nodes that are capable of both fine-granularity and coarse-granularity carrier switching may also include core nodes that perform coarse carrier switching to connect the shell nodes. The use of both fine-granularity and coarse-granularity carrier switching leads to the ability to design a compact and efficient network. Such a network may be preferred over known optical network structures for a capability of expansion beyond a continental scale, support for large numbers of edge nodes and a higher bit rate capacity.

In accordance with an aspect of the present invention there is provided a network. The network includes an optical core node adapted to perform channel switching and a plurality of optical shell nodes adapted to perform both time switching and channel switching, where each shell node in the plurality of shell nodes communicatively connects to the optical core node and receives time division multiplexed signals from a plurality of electronic edge nodes.

In accordance with another aspect of the present invention there is provided a method of controlling a shell node, where the shell node is in communication with a plurality of edge nodes and a channel switching core node. The method includes transmitting a channel switching request to the core controller in respect of a given channel, receiving a channel switching permit from the core controller and, responsive to receiving the channel switching permit, controlling time switching within an associated shell node, where the time switching directs time-limited signals to the given channel.

In accordance with still another aspect of the present invention there is provided a shell node controller. The shell node controller includes a plurality of output ports each adapted to transmit a channel switching request to a core controller in respect of a given channel, a plurality of input ports each adapted to receive a channel switching permit from the core controller and an admission controller adapted to, responsive to receiving the channel switching permit, control time switching within an associated shell node, where the time switching directs time-limited signals to the given channel.

In accordance with a further aspect of the present invention there is provided a computer readable medium containing computer-executable instructions. The computer-executable instructions, when performed by a processor in a shell node controller, cause the processor to transmit a channel switching request to a core controller in respect of a given channel, receive a channel switching permit from the core controller and, responsive to receiving the channel switching permit, control time switching within an associated shell node, where the time switching directs time-limited signals to the given channel.

In accordance with a still further aspect of the present invention there is provided a method of controlling a core node, where the core node is in communication with a plurality of optical shell nodes and the core node includes a plurality of indexed switching planes. The method includes receiving a channel switching request from a source shell node in the plurality of optical shell nodes, determining, from the channel switching request, a destination shell node in the plurality of optical shell nodes, finding a first channel path, associated with a first one of the switching planes of the plurality of indexed switching planes, to the destination shell node and finding a second channel path, associated with a second one of the switching planes of the plurality of indexed switching planes, to the destination shell node. The method also includes selecting a preferred channel path, between the first channel path and the second channel path, where the preferred channel path is associated with the switching plane having the lesser index value and transmitting a confirmation to the source shell node, the confirmation indicating that a path has been found.

In accordance with an even further aspect of the present invention there is provided a controller for a core node that includes a plurality of indexed switching planes. The controller includes an input port adapted to receive a channel switching request from a source shell node in a plurality of optical shell nodes and an admission controller adapted to determine, from the channel switching request, a destination shell node in the plurality of optical shell nodes, find a first channel path, associated with a first one of the switching planes of the plurality of indexed switching planes, to the destination shell node, find a second channel path, associated with a second one of the switching planes of the plurality of indexed switching planes, to the destination shell node and select a preferred channel path, between the first channel path and the second channel path, where the preferred channel path is associated with the switching plane having the lesser index value. The controller also includes an output port adapted to transmit a confirmation to the source shell node, the confirmation indicating that a path has been found.

In accordance with a still further aspect of the present invention there is provided a computer readable medium containing computer-executable instructions. The computer-executable instructions, when performed by a processor in a core node controller, cause the processor to receive a channel switching request from a source shell node in a plurality of optical shell nodes, determine, from the channel switching request, a destination shell node in the plurality of optical shell nodes, find a first channel path, associated with a first one of the switching planes of the plurality of indexed switching planes, to the destination shell node, find a second channel path, associated with a second one of the switching planes of the plurality of indexed switching planes, to the destination shell node, select a preferred channel path, between the first channel path and the second channel path, where the preferred channel path is associated with the switching plane having the lesser index value, and transmit a confirmation to the source shell node, the confirmation indicating that a path has been found.

In accordance with a still further aspect of the present invention there is provided a shell node. The shell node includes a plurality of input ports including a plurality of inlet ports adapted to receive time-divided signals from edge nodes and a plurality of inbound ports adapted to receive carrier signals from other shell nodes. The shell node also includes a plurality of output ports including a plurality of outlet ports adapted to transmit signals to edge nodes and a plurality of outbound ports adapted to transmit signals to the other shell nodes. The shell node further includes a switching plane adapted to controllably connect the input ports to the output ports and a shell node controller adapted to control the switching plane to time-switch the time-divided signals received at the inlet ports toward the outlet ports and the outbound ports and channel-switch the carrier signals received at the inbound ports toward the outlet ports.

In accordance with a still further aspect of the present invention there is provided a method of switching at a shell node. The method includes time-switching time-divided signals received from a first node that is time-locked to the shell node, irrespective of whether the shell node is time-locked to nodes to which the signals are destined and channel-switching carrier signals received from a second node that may not be time-locked to the shell node.

In accordance with a still further aspect of the present invention there is provided a switching shell node. The switching shell node includes means for time-switching time-divided signals received from a first node that is time-locked to the shell node, irrespective of whether the shell node is time-locked to nodes to which the signals are destined and means for channel-switching carrier signals received from a second node that need not be time-locked to the shell node.

In accordance with a still further aspect of the present invention there is provided a lattice network. The lattice network includes a plurality of optical shell nodes logically arranged in at least two networks of a first type, each network of the first type having at least two optical shell nodes and a plurality of shell controllers, each shell controller of the plurality of shell controllers corresponding to one of the plurality of optical shell nodes. The lattice network further includes a first means for interconnecting the at least two optical shell nodes of each of the at least two networks of the first type and, where the optical shell nodes are further logically arranged in at least two networks of a second type, each network of the second type including one of the at least two optical shell nodes from each of the at least two networks of the first type, a second means for interconnecting the optical shell nodes of the networks of the second type. The lattice network further includes a plurality of edge nodes, each edge node of the plurality of edge nodes subtending to at least one of the plurality of optical shell nodes and a plurality of edge controllers, each edge controller of the plurality of edge controllers corresponding to one of the plurality of edge nodes, wherein each edge controller is operable to exchange time-locking signals with the shell controller corresponding to each optical shell node to which the corresponding edge node subtends and each shell controller is operable to exchange time-locking signals with edge controllers, of the plurality of edge controllers, corresponding to the subtending edge nodes.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
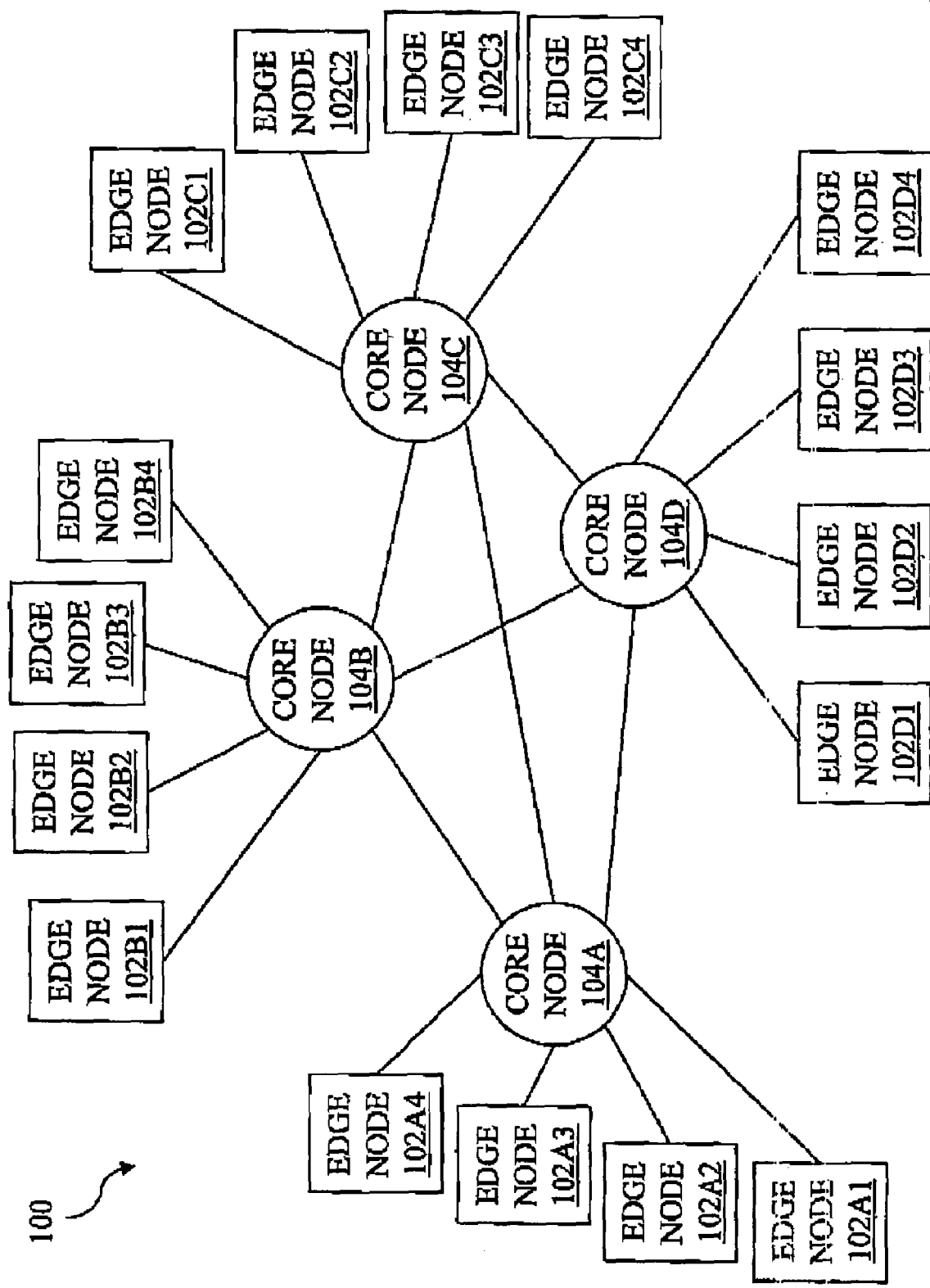
FIG. 1 illustrates a network having electronic edge nodes interconnected by optical core nodes.

FIG. 1 illustrates a network 100 comprising four optical core nodes each connecting to a set of electronic edge nodes. A first set of edge nodes 102A1, 102A2, 102A3 and 102A4 (where the set is referred to as 102A) is interconnected through a first optical core node 104A, a second set of edge nodes 102B1, 102B2, 102B3 and 102B4 (where the set is referred to as 102B) is interconnected through a second optical core node 104B, a third set of edge nodes 102C1, 102C2, 102C3 and 102C4 (where the set is referred to as 102C) is interconnected through a third optical core node 104C and a fourth set of edge nodes 102D1, 102D2, 102D3 and 102D4 (where the set is referred to as 102D) is interconnected through a fourth optical core node 104D.

An edge node may comprise two nodes; a source node and a sink node and the two nodes may be combined to share memory and control. Reference to a source node is understood to imply the associated edge node and, likewise, reference to a sink node is understood to imply its associated edge node.

The four core nodes (referred to collectively or individually as 104) are interconnected by optical-fiber links, each link carrying an optical signal comprising several wavelength-division multiplexed (WDM) optical signals. In other words, each link comprises several wavelength channels. In a channel-switching node, entire wavelength channels are switched from input ports to output ports. In a time-switching node, time-limited signals can switched from a plurality of input ports to a single output port. The time-limited signals can take the form of signal bursts of arbitrary durations, or time-slotted signals of equal duration as in TDM systems. In order to enable time sharing of the individual channels, so that a channel may carry signals destined to two or more edge nodes, the transmission time of each signal originating at an edge node must be adjusted so that the signal reaches intermediate nodes at prescribed instants of time. This process of time adjustment is called "time locking" and is described in applicant's United States patent application 09/286,431, filed on Apr. 6, 1999, and titled "Self-Configuring Distributed Switch", and U.S. patent application Ser. No. 10/054,509, filed on Nov. 13, 2001 and titled "Time-Coordination in a Burst-Switching Network", the specification of which are incorporated herein by reference.

A first node can only time lock to a second node if the first node has a means for storing signals. Currently, this facility is only available in electronic nodes where high-capacity, high-speed random-access memory devices are widely available.

Figure 2:
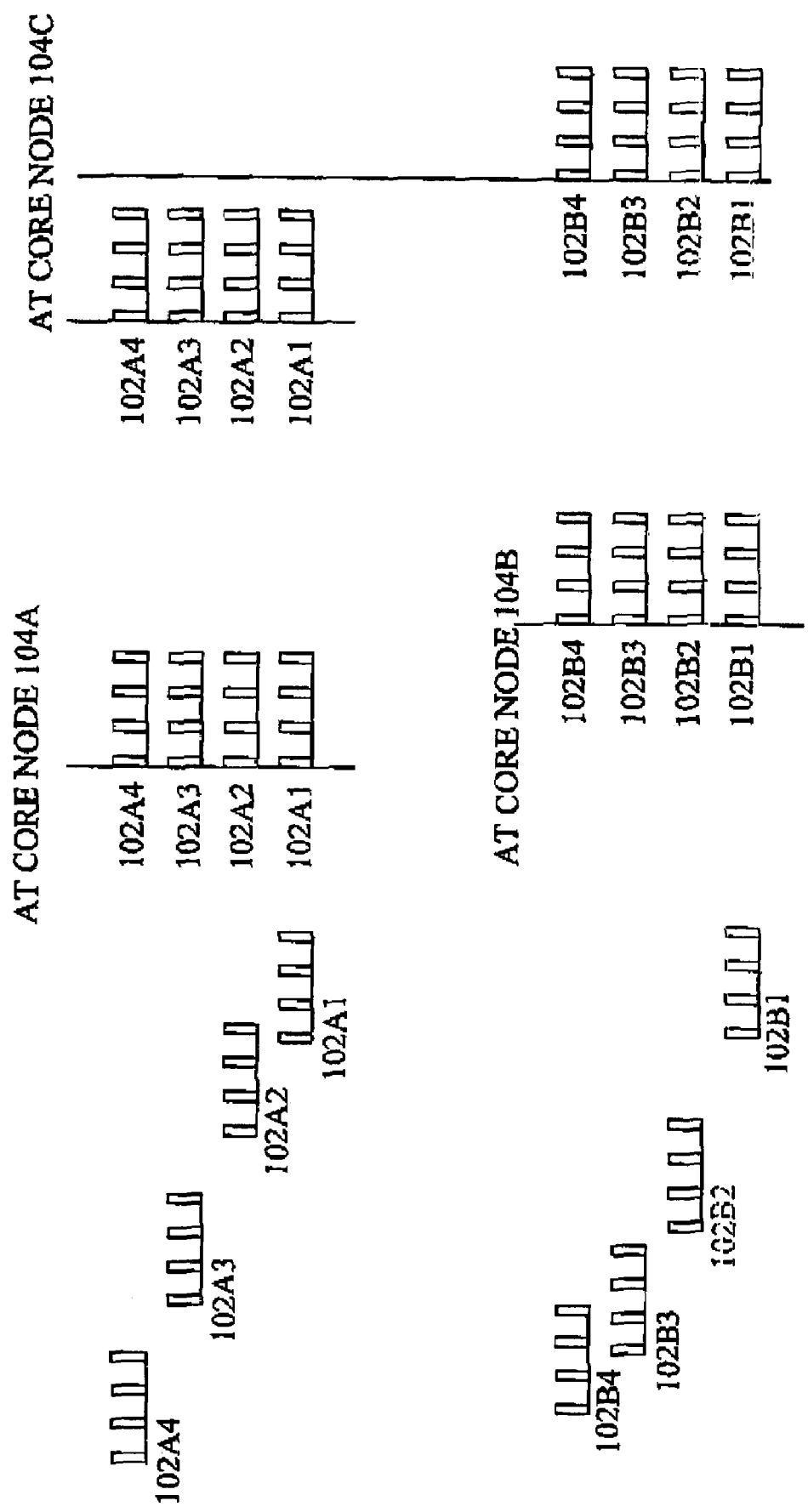
FIG. 2 illustrates an aspect of a process of time locking edge node to core nodes in the network of FIG. 1.

Referring to FIG. 1, it is possible to time lock each edge node in the first set of electronic edge nodes 102A to the first optical core node 104A. Likewise, each of the electronic edge nodes 102 connecting to each of the other optical core nodes 104 can time lock to the optical core node 104 to which it is connected. FIG. 2 illustrates a signal, organized as a time-division-multiplexed (TDM) frame, transmitted by each edge node in the first set of edge nodes 102A at selected instants of time so that the four TDM frames are aligned, in time, when the TDM frames reach the first optical (and, therefore, bufferless) core node 104A. Similarly, TDM frames from the second set of edge nodes 102B are aligned when the TDM frames reach the second optical core node 104B. Thus, the first set of edge nodes 102A are time locked to the first core node 104A and the second set of edge nodes 102B are time locked to the second optical core node 104B.

An edge node in the first set of edge nodes 102A can exchange signals with another edge node in the first set of edge nodes 102A, during any time slot through, the first core node 104A. An edge node in the second set of edge nodes 102B can exchange signals with another edge node in the second set of edge nodes 102B, during any time slot through, the second core node 104B. Signals transmitted by any of the edge nodes in the first set of edge nodes 102A and the signals from edge nodes in the second set of edge nodes 102B may also be destined to an edge node in the third set of edge nodes 102C connecting to the third core node 104C. As illustrated in FIG. 2, the TDM frames may not be aligned when they reach the third core node 104C, due to differing propagation delays. The TDM frames can be aligned at the third core node 104C if the difference between propagation delay from the first core node 104A and the propagation delay from the second core node 104B to the third core node 104C, is an exact integer multiple of the duration of the TDM-frame. Such a lucky coincidence would be a rare event and artificial means of producing this effect, by adjusting the lengths of the fiber links, may neither be practical nor reliable.

Figure 3:
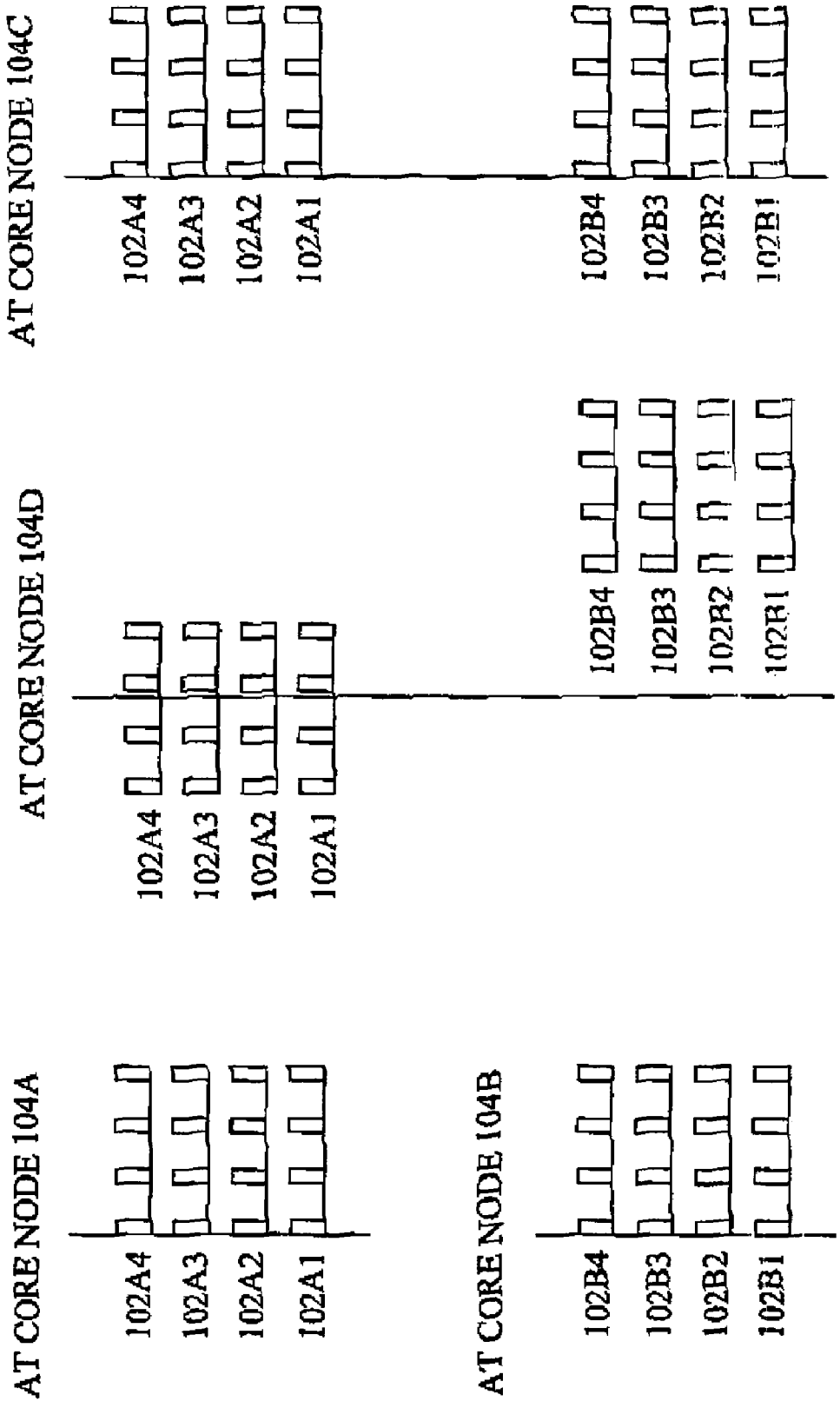
FIG. 3 illustrates another aspect of a process of time locking of edge nodes to a core nodes in the network of FIG. 1.

FIG. 3 illustrates a case where each of edge nodes in the first set of edge nodes 102A and the second set of edge nodes 102B time locks to the third core node 104C, instead of respective "home" core nodes 104A and 104B. This, however, would prevent time-multiplexed communication between edge nodes in the first set of edge nodes 102A and edge nodes in the second set of edge nodes 102B, or between edge nodes in the first set of edge nodes 102A and the second set of edge nodes 102B and edge nodes in the fourth set of edge nodes 102D. As illustrated in FIG. 3, the TDM frames from any of edge nodes $A_j$, or $B_j$, j=1, . . . , 4, are likely to be unaligned when they reach the fourth core node 104D.

Time locking would not be needed if coarse carrier switching, i.e., channel switching, is used instead of time switching. Channel switching can, however, severely affect the network efficiency. An edge node that has a small number of channels connecting to a core node can only reach an equally small number of destination edge nodes, thus forcing edge-to-edge hopping to reach a larger number of destination edge nodes. A significant improvement, however, can be realized in a network wherein TDM switching is employed for edge-node-to-core-node communication while channel switching is employed for inter-core-node communication. The signal carried by a single channel emanating from a core node in such a network would still be restricted to a single destination edge node, that is, channel switching is employed for core-node-to-edge-node communication. However, the signal can be a multiplex of time slots from the signals transmitted by numerous subtending edge nodes. For example, if a core node has 256 input channels received from its subtending edge nodes, and using a TDM frame of at least 256 time slots, then an outbound core channel can carry signals from each of the input ports to a single destination edge node. The increased efficiency arises from the aggregation afforded by the fast time switching at the core node.

Figure 4:
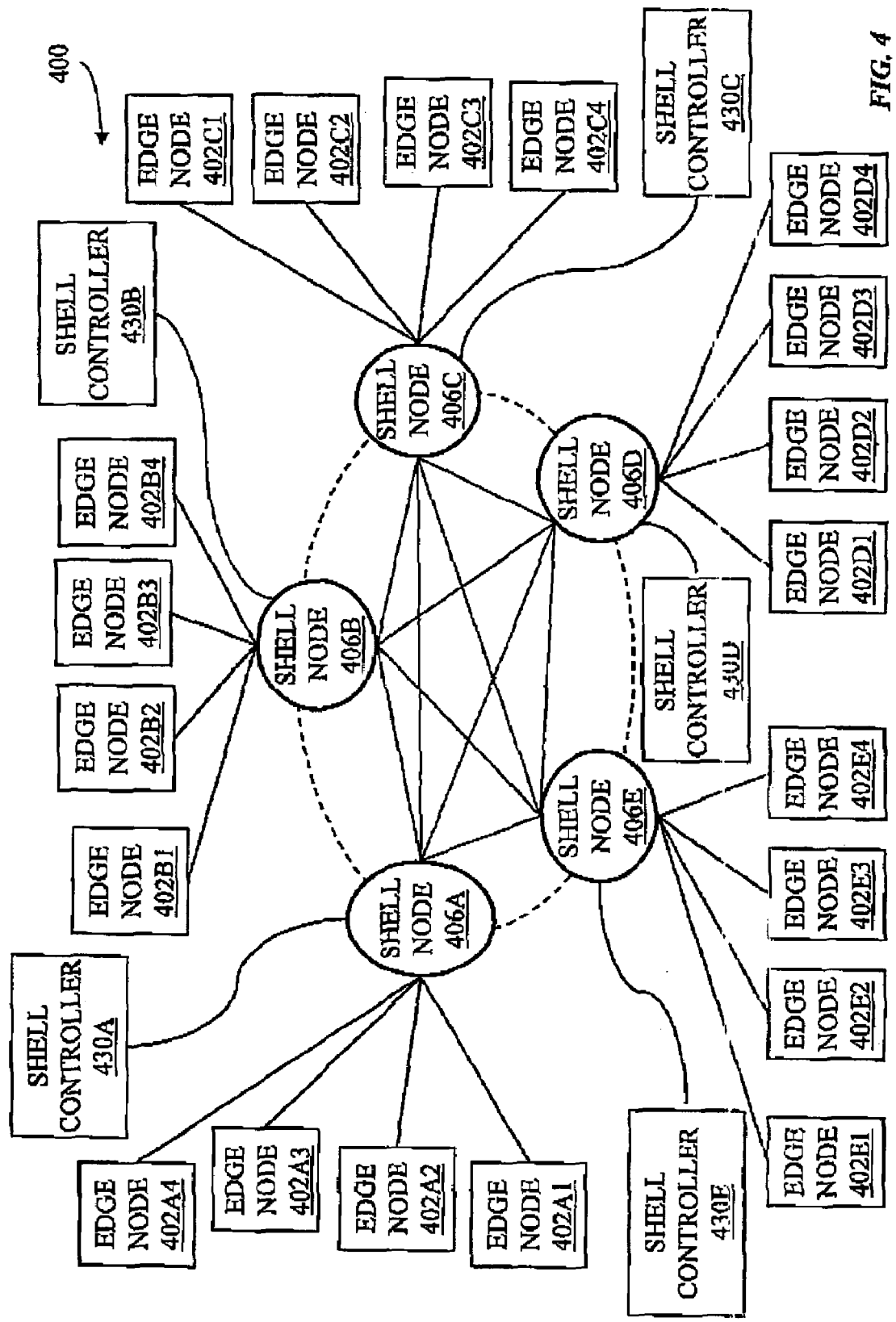
FIG. 4 illustrates a network similar to the network of FIG. 1, the network adapted to combine fine and coarse carrier switching according to an embodiment of the present invention.

FIG. 4 illustrates a network 400 where five fast-switching, fine-granularity, optical nodes, herein called shell nodes 406A, 406B, 406C, 406D, 406E (referred to collectively or individually as 406), are interconnected in a mesh structure.

A first set of edge nodes 402A1, 402A2, 402A3 and 402A4 (where the set is referred to as 402A) subtends to a first shell node 406A, a second set of edge nodes 402B1, 402B2, 402B3 and 402B4 (where the set is referred to as 402B) subtends to a second shell node 406B, a third set of edge nodes 402C1, 402C2, 402C3 and 402C4 (where the set is referred to as 402C) subtends to a third shell node 406C, a fourth set of edge nodes 402D1, 402D2, 402D3 and 402D4 (where the set is referred to as 402D) subtends to a fourth shell node 406D and a fifth set of edge nodes 402E1, 402E2, 402E3 and 402E4 (where the set is referred to as 402E) subtends to a fifth shell node 406E. Though not indicated in FIG. 4, an edge node may connect to more than one shell node. For example, edge node 402B1 may have a link to shell node 406B, as illustrated, and another link to shell node 406A (not shown).

If the part of the aggregate traffic from the subtending edge nodes 402 of a given shell node 406 and destined to a designated edge node 402 subtending to a destination shell node 406 occupies a small fraction of a channel capacity, then this part of the aggregate traffic may be combined with other traffic that is destined to other edge nodes 402 subtending to the destination shell node. The combined traffic would be delivered to a selected single edge node 402 subtending to the destination shell node 406 and, subsequently, be efficiently time switched to other intended edge nodes 402 subtending to the destination shell node 406. The selected edge node 402 would preferably be the edge node 402 to which the largest proportion of the combined traffic is destined.

For example, if the aggregate data rate, of data that is destined to edge node 402E1 from edge nodes in the first set of edge nodes 402A, is 1 Gb/s and a channel capacity is 10 Gb/s, then the data intended for edge node 402E1 can be combined with data destined to edge nodes 402E2, 402E3 and 402E4. If edge nodes 402E2, 402E3 and 402E4 are to receive data at bit rates of 4, 2 and 1 Gb/s, respectively, then 402E2 would be selected to receive the combined traffic originating at edge nodes in the first set of edge nodes 402A.

A shell controller 430A, 430B, 430C, 430D, 430E is associated with each shell node 406A, 406B, 406C, 406D, 406E and serves to coordinate the time switching and channel switching functions as will be described below.

Figure 5:
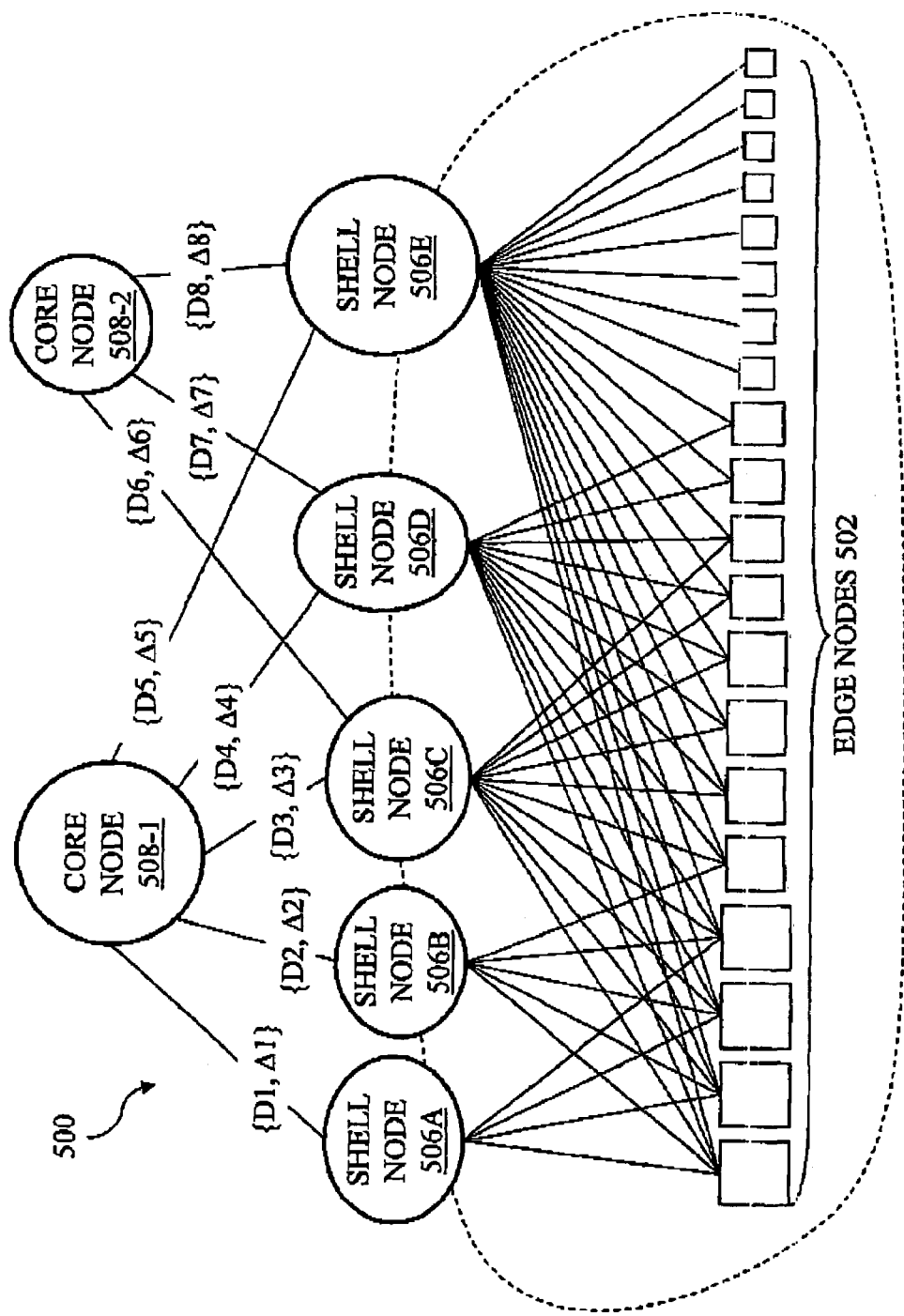
FIG. 5 illustrates a network having an optical core that comprises a shell layer and a nucleus layer.

FIG. 5 illustrates an alternative network structure 500 which comprises fast-switching optical shell nodes 506A, 506B, 506C, 506D, 506E (referred to collectively or individually as 506), similar to the shell nodes 406 of FIG. 4, each having several subtending edge nodes 502. The shell nodes 506 are interconnected by optical core nodes 508-1, 508-2 (referred to collectively or individually as 508) instead of being directly connected to each other as in the network 400 of FIG. 4. Each shell node 506 is connected to at least one core node 508 by an outbound link and an inbound link. In this exemplary network, only two core nodes 508 are illustrated. The propagation delays, in opposite directions, along each link between each shell node and respective core nodes are denoted $\{D_j, \Delta_j\}$, j=1, . . . , 8, where $D_j$ is the propagation delay from a shell node to a core node, and $\Delta_j$ is the propagation delay in the opposite direction. The values of $D_j$ and $\Delta_j$, for the same shell-core node pair may differ significantly.

The purpose of FIG. 5 is to illustrate the difficulty of time switching, using TDM for example, across the entire network, where a path may traverse two or more optical (bufferless) nodes that are not collocated. It is possible to time lock each shell node 506 to core node 508-1, then to time lock each edge node 502 to each shell node 506 to which it connects. An edge node 502 includes a baseband switch that has numerous buffers. Hence, the edge node 502 can time lock to numerous optical nodes having optical-carrier switches. Thus, all upstream TDM frames transmitted from the edge nodes 502 towards core node 508-1 can arrive at core node 508-1 in alignment. However, in the downstream direction, the TDM frames arriving from core node 508-1 to a shell node 506 would not be aligned with TDM frames arriving at the shell node 506 from subtending edge nodes 502. Additionally, the upstream TDM frames directed to core node 508-2 would not, except by coincidence, be aligned when they arrive at core node 508-2.

A compromise, then, is to limit time switching to the traffic between the edge nodes 502 and the shell nodes 506 and to use channel switching for the traffic between the shell nodes 506 and the core nodes 508. Such a compromise is illustrated in FIG. 6.

Figure 6:
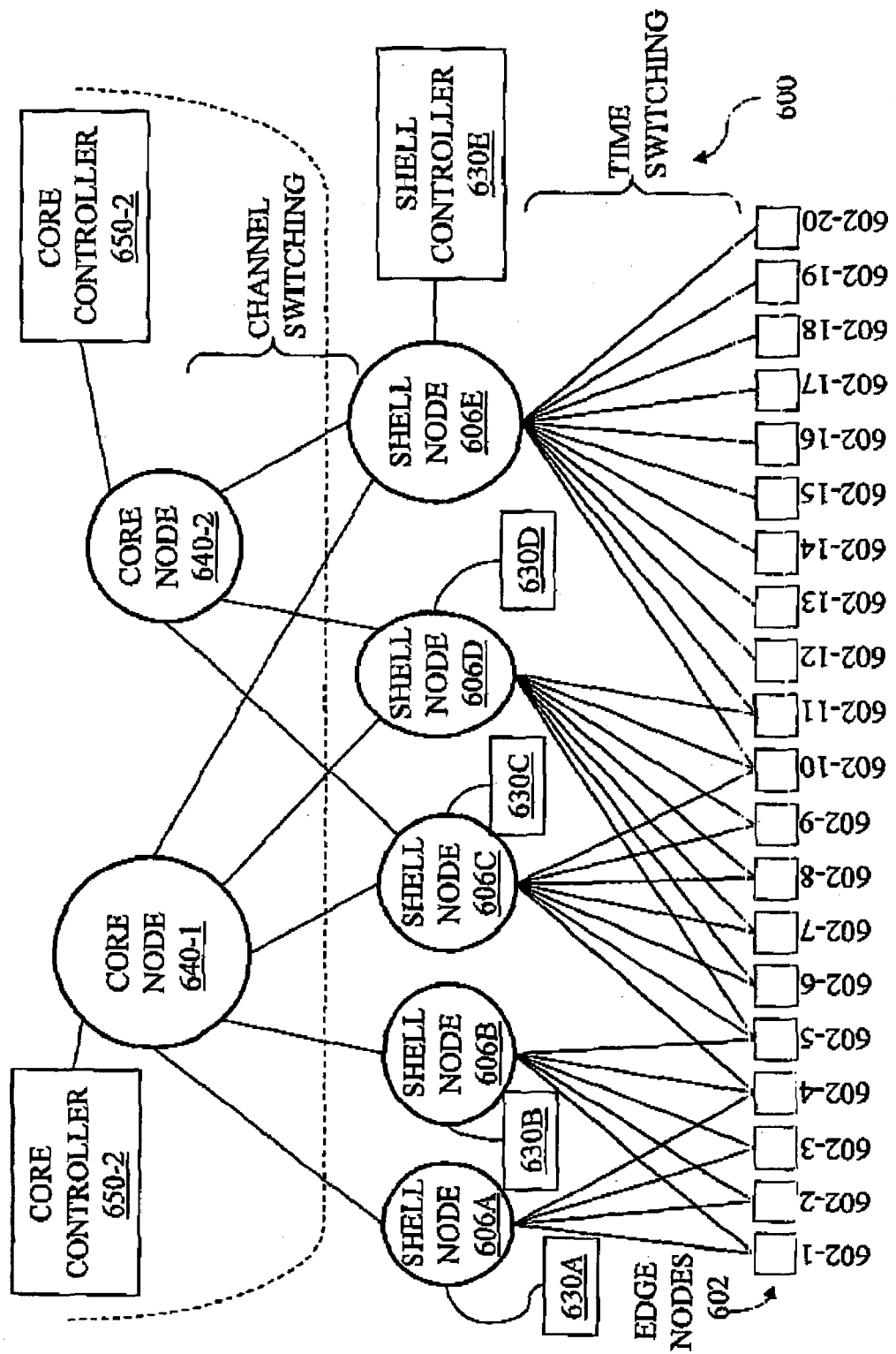
FIG. 6 illustrates a network similar to the network of FIG. 5 but adapted to perform fine and coarse carrier switching according to an embodiment of the present invention.

FIG. 6 illustrates a network 600 which comprises fast-switching optical shell nodes 606A, 606B, 606C, 606D, 606E (referred to collectively or individually as 606), similar to the shell nodes 506 of FIG. 5, each having several subtending edge nodes 602. The shell nodes 606 are interconnected by optical core nodes 640-1, 640-2 (referred to collectively or individually as 640) as in the network 500 of FIG. 5. A shell controller 630A, 630B, 630C, 630D, 630E is associated with each shell node 606 and a core controller 650-1, 650-2 is associated with each core node 640. The coordination of the time switching and channel switching will be described in further detail below.

As indicated in FIG. 6, an edge node may connect to several shell nodes. An edge node has buffers at each output ports and, hence, can time-lock to several shell nodes. Those edge nodes 602 that are connected to the same shell node 606 can exchange time-slotted carrier signals through that shell node. However, an edge node 602 connected to a given set of shell nodes 606 can only receive a continuous carrier signal from an edge node 602 not connecting to any of the given set of shell nodes. For example, edge node 602-1 can receive time-slotted carrier signals from edge nodes 602-2, 602-3, and 602-4 through shell node 606A. Edge node 602-1 can also receive time-slotted carrier signals from edge nodes 602-2, 602-3, 602-4, and 602-5 through shell node 606B. However, edge node 602-1 can only receive continuous carrier signals from edge nodes 602-6 to 602-20. Similarly, edge-node 602-12 can receive time-slotted carrier signals from edge nodes 602-10 to 602-20 through shell node 606E and continuous carrier signals from edge nodes 602-1 to 602-9 through core nodes 640-1 or 640-2 and shell node 606E. Edge node 602-11, however, can receive time-slotted carrier signals from edge nodes 602-5 to 602-20. Edge node 602-11 receives time-slotted carrier signals from 602-5 to 602-9 through shell node 606-D, from edge nodes 10 through either shell node 606D or shell node 606E, and from edge nodes 602-12 to 602-20 through shell node 606E. An edge node in which the input ports and output ports share a common fabric does not need to perform internal switching, from any of its input ports to any of its output ports through a shell node.

Direct interconnection of shell nodes 606, in addition to interconnection through core nodes 640, can be implemented. The shell node 606 would then be operated as one of the shell nodes 406 of the network 400 of FIG. 4. For example, if it is known that the data rate from a first shell node to a second shell node consistently exceeds 400 Gb/s, then it would be justifiable to have a direct fiber link having 32 wavelength channels, with a total data carrying capacity of 320 Gb/s, connecting 32 outbound ports of the first shell node to 32 inbound ports of the second shell node.

Figure 7:
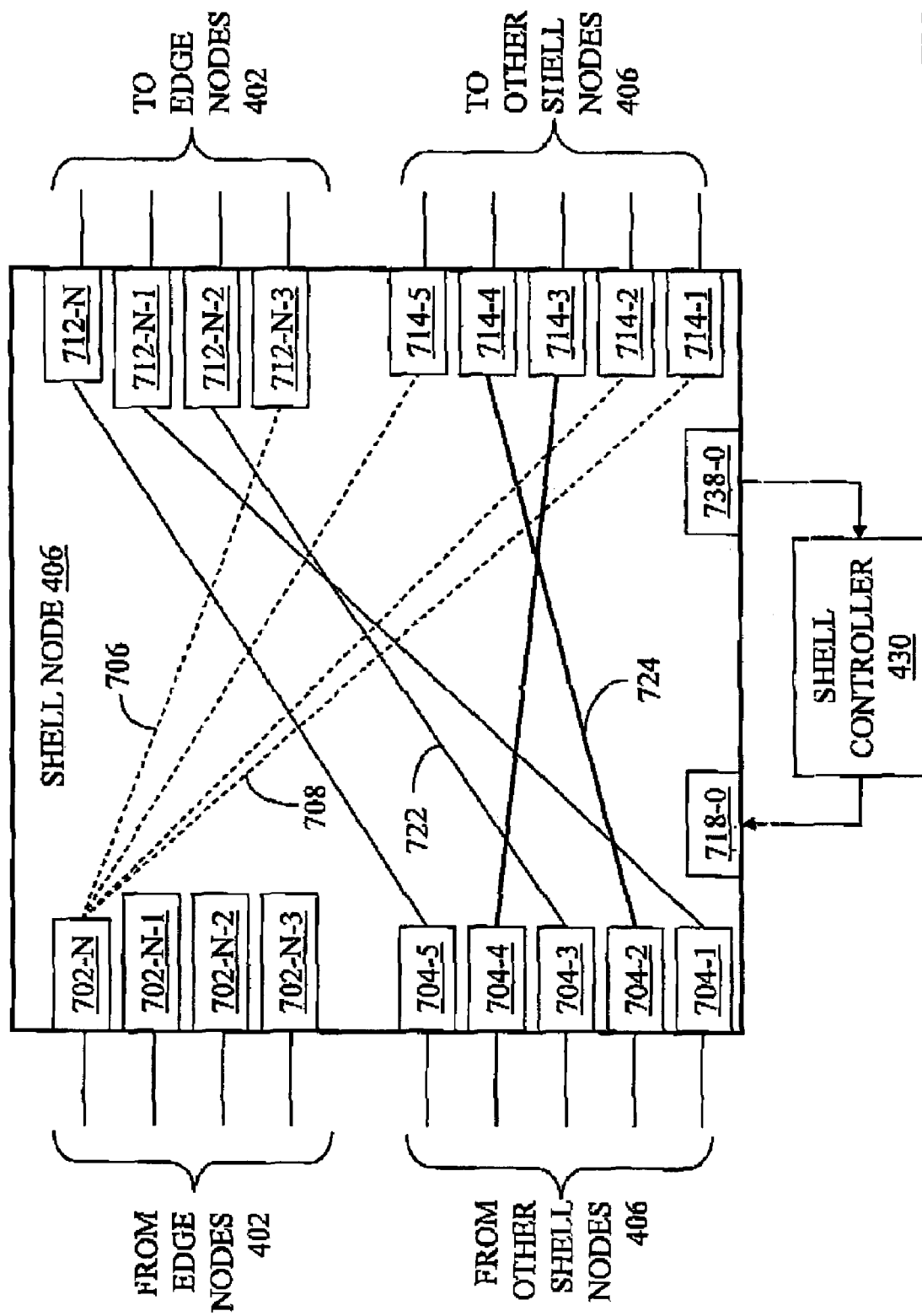
FIG. 7 illustrates a shell switch for use in the network of FIG. 4 according to an embodiment of the present invention.

FIG. 7 illustrates an exemplary shell node 406 of the type used in the network 400 of FIG. 4. The shell node 406 has N+1 input ports numbered 0 to N and N+1 output ports numbered 0 to N. The first input port 718-0 and the first output port 738-0 are used to connect to the shell controller 430, the operation of which will be described below.

The input ports are divided into inlet ports 702 receiving time-multiplexed optical signals from subtending edge nodes 402 and inbound ports 704 receiving optical signals from other shell nodes 406. An optical signal received by an inbound port 704 is treated as a continuous signal, even though the optical signal is assembled as a time-multiplexed signals at another shell node 406. As described above, optical signals received at inbound ports 704 are not necessarily aligned with TDM optical signals received at other input ports, including inlet ports 702 and inbound ports 704.

The output ports are divided into outlet ports 712, connecting to the edge nodes 402 by outlet links, and outbound ports 714 connecting to other shell nodes 406 by outbound links. An output port, whether an outlet port 712 or an outbound port 714, may receive a time-multiplexed optical signal from an inlet port 702 of the same shell node 406 or a continuous optical signal from an inbound port 704 of the same shell node 406. A continuous signal received at an outlet port 712 is sent to an edge node 402 where, with the help of an electronic buffer, the continuous signal may be treated as a time-multiplexed signal carrying data to an arbitrary number of egress ports of the edge node 402. A continuous signal received at an outbound port 714 of the shell node 406 was generated at another shell node 406 and is switched at the current shell node 406 towards a destination shell node 406.

In FIG. 7, a first connection 706, illustrated by a dashed line, is a TDM connection from an inlet port 702 to an outlet port 712, carrying data from an edge node 402 subtending to the exemplary shell node 406 to an edge node also subtending to the exemplary shell node 406. The TDM connection includes at least one time slot per TDM frame. A second connection 708, illustrated by a dashed line, is a TDM connection from an inlet port 702 to an outbound port 714, carrying data from an edge node 402 subtending to the exemplary shell node 406 to an edge node 402 subtending to another shell node 406. A third connection 722, illustrated by a solid line, is a channel connection carrying data from edge nodes subtending to another shell node 406 to an edge node subtending to the exemplary shell node 406. A fourth connection 724, illustrated by a bold solid line, is a channel connection carrying data from edge nodes 402 subtending to another shell node 406 connected to an inbound port 704 of the exemplary shell node 406 to an edge node subtending to another shell node 406 connected to an outbound port 714 of the exemplary shell node 406. The fourth connection 724 is illustrated by a bold solid line to emphasize that the fourth connection 724 is a tandem connection originating from, and destined to, edge nodes 402 associated with other shell nodes 406.

Figure 8:
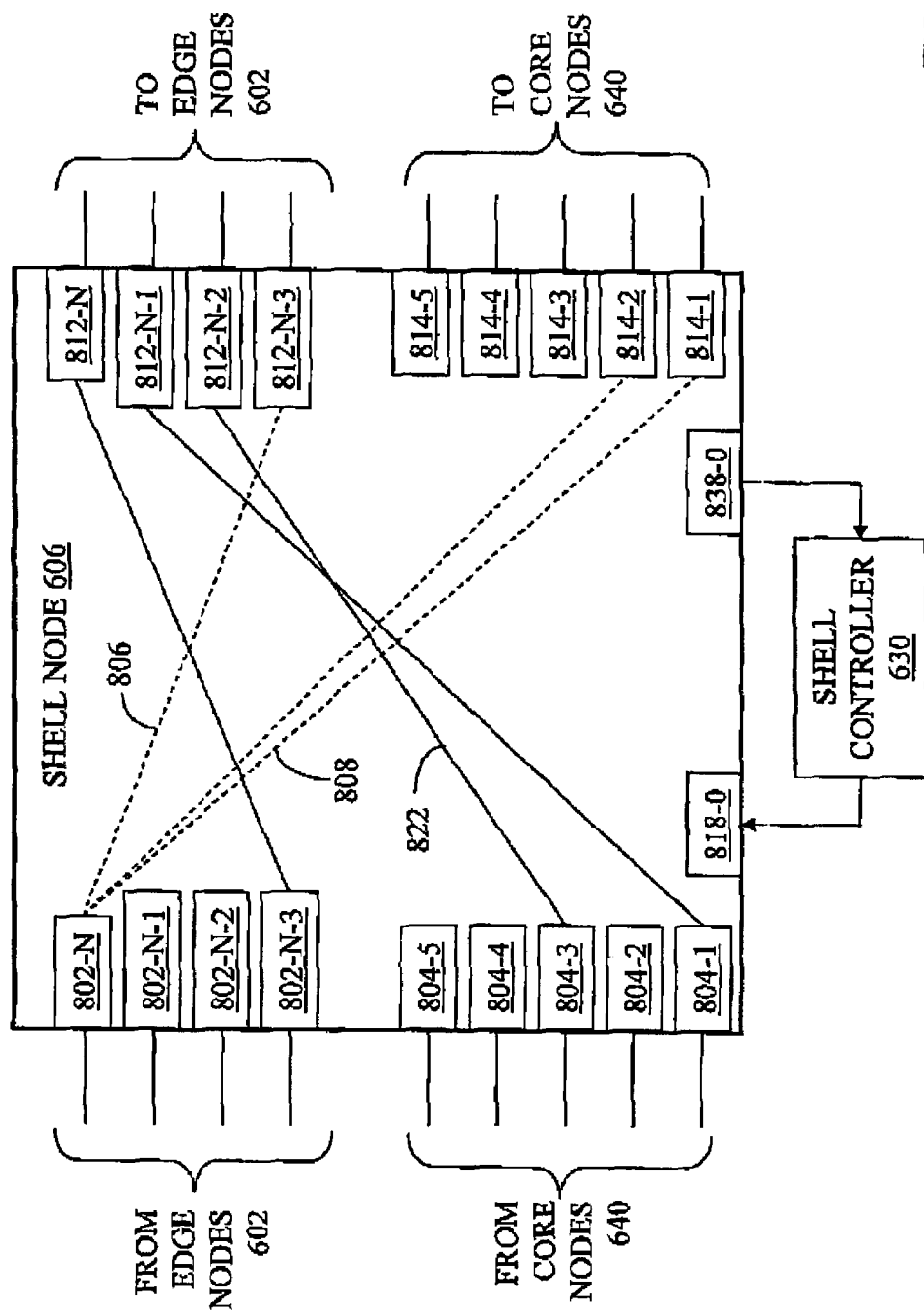
FIG. 8 illustrates a shell switch for use in the shell layer of FIG. 6 according to an embodiment of the present invention.

FIG. 8 illustrates an exemplary shell node 606 of the type used in the network 600 of FIG. 6. The shell node 606 has N+1 input ports numbered 0 to N and N+1 output ports numbered 0 to N. The first input port 818-0 and the first output port 838-0 are used to connect the exemplary shell node 606 to the shell controller 630, the operation of which will be described below.

The input ports are divided into inlet ports 802 receiving time-multiplexed optical signals from subtending edge nodes 606 and inbound ports 804 receiving optical signals from the core nodes 640. The output ports are divided into outlet ports 812, connecting to the edge nodes 602 by outlet links, and outbound ports 814 connecting to the core nodes 640 by outbound links.

The shell node 606 of FIG. 8 is quite similar to shell node 406 of FIG. 7. The main difference is that the outbound ports 814 connect to the core nodes 640 rather than to other shell nodes. Therefore, there is no tandem switching through the exemplary shell node 606 and each outbound port 814 receives time-multiplexed optical signals from at least one of the inlet ports 802. An outlet port 812 may still receive either a time-multiplexed signal from at least one inlet port 802 or a continuous signal from one of the inbound ports 804.

In FIG. 8, a first connection 806, a second connection 808 and a third connection 822 are analogous to first, second and third connections 706, 708 and 722 of FIG. 7. There is no connection analogous to the fourth connection 724 of FIG. 7, because the shell nodes 606 in the structure of FIG. 6 are not directly connected to each other. The addition of shell node direct interconnection to the network structure 600 of FIG. 6 may be desirable and will be described below with reference to FIG. 13.

Connection Control

An ingress port of an edge node receives requests from data sources to transfer data to specified data sinks. Each received request is examined by an edge controller associated with the edge node to determine the edge node to which the data sink is connected. The requests received at each ingress port are aggregated and sorted according to destination edge nodes. The edge controller preferably estimates the capacity requirement for each data stream defined by a source edge node and a destination edge node. Aggregate connection requests are then generated, each aggregate connection request specifying a source edge node, a destination edge node and a required capacity.

In both the network structure 400 of FIG. 4 and the network structure 600 FIG. 6, a source edge node communicates the generated connection requests to the bufferless shell nodes in either of two methods. The first method is based on out-of-band signaling and the second method is based on in-band signaling. In-band signaling to a shell controller can only be used if the shell node is fast-switching. In the network structure 400 of FIG. 4, shell controllers 430 need to communicate with other shell controllers 430 and, given that such a network structure allows for inter-shell channel switching, only out-of-band signaling can be used among shell nodes 406. In the network structure 600 of FIG. 6, shell controllers 630 also need to communicate with core controllers 650 and, given that such a network structure uses channel switching core nodes, only out-of-band signaling can be used between the shell nodes 606 and the core nodes 640.

With out-of-band signaling, a WDM link from a source edge node to a shell node includes at least one wavelength channel dedicated to carry control data and the remaining wavelength channels carry payload data. At the shell node, the WDM signal carried by the WDM link is demultiplexed into its constituent wavelength channels. The payload channels, i.e., channels carrying payload data, are then directed to inlet ports of the shell node and a control channel is directed to a shell controller after an optical-to-electrical (O-E) signal conversion. This method can be applied to both time switching and channel switching and it requires that at least one wavelength channel from each inbound WDM link be dedicated to signaling. It is unlikely, however, that more than one signaling channel be required. The bit rate of control data is typically orders of magnitude smaller than the bit rate of payload data. Thus, with a relatively small number of wavelength channels per link, eight for example, the use of a dedicated signaling channel would be considered wasteful but unavoidable if the shell node is a slow carrier switch.

With time switching in a fast shell node, in-band signaling can be used. As indicated in FIG. 7 and FIG. 8, a shell controller connects to an input port (input-port 0) and an output port (output port 0). A shell controller computes a schedule for data transfer from each input port, at each time slot of a TDM frame, to a designated output port. The computed schedule is communicated to a connectivity controller (not illustrated) which is a slave controller that directs each input optical signal to its designated output port as dictated by the shell controller. A source edge node can not communicate with a time-switched shell node unless the source edge node is time locked to the shell node. When time locking is achieved, the source edge node reliably sends both control data to the shell controller and payload data to traverse the shell node. A shell node can always communicate both control data and payload data to a destination edge node without timing restrictions because each destination edge node has an electronic buffer.

A schedule generated by the shell controller includes a permanent control time slot dedicated to transfer data from each inlet port to the input port of the shell controller. The control time slots assigned to the inlet ports are staggered so that the shell controller can receive from the inlet ports the control time slots one at a time. Likewise, the shell controller uses dedicated control time slots in the TDM frames at outlet ports to communicate control data to edge nodes and the control time slots are staggered. If the number of inlet ports exceeds the number of time slots per TDM frame, then more ports can be assigned to the shell controller. The preferred number of time slots per TDM frame ranges from 256 to 1,024 and the number of inlet ports are unlikely to exceed 256.

To realize the aforementioned time locking, a source edge node continually sends a stream of readings of its time counter over the entire TDM frame until it is informed that time locking is secured. The connectivity controller of the shell node transfers a slice of the carrier-signal to the shell controller during the time slot dedicated for the source node. At a bit rate of 10 Gb/s, a time slot of one microsecond duration contains 10,000 bits, which can be structured to include numerous time-counter readings where each reading consumes a few bytes. The shell controller can therefore parse the control data received from a source edge node, determine the reading of the time counter of the shell controller corresponding to a selected reading of the source edge node and communicate the two readings back to the source edge node, which would then be able to reset its time counter and proceed to send connection requests and, eventually, payload data.

At the start, or restart, of a given shell controller, none of the source edge nodes may be time locked to the shell controllers and all source edge nodes may proceed simultaneously to establish time locking. A time locked source edge node periodically sends a time-counter reading to the controller of each shell node to which the source node is connected to ensure continued time locking.

Each shell controller 430 in the network 400 of FIG. 4 is aware of the connectivity of the shell node interconnection and can therefore construct a set of routes for each pair of shell nodes 406. Each shell controller 630 in the network 600 of FIG. 6 is aware of the connectivity of the shell nodes 606 and the core nodes 640 and can construct route sets for each pair of shell nodes 606. The routes in a route set are sorted according to a merit criterion.

Figure 12:
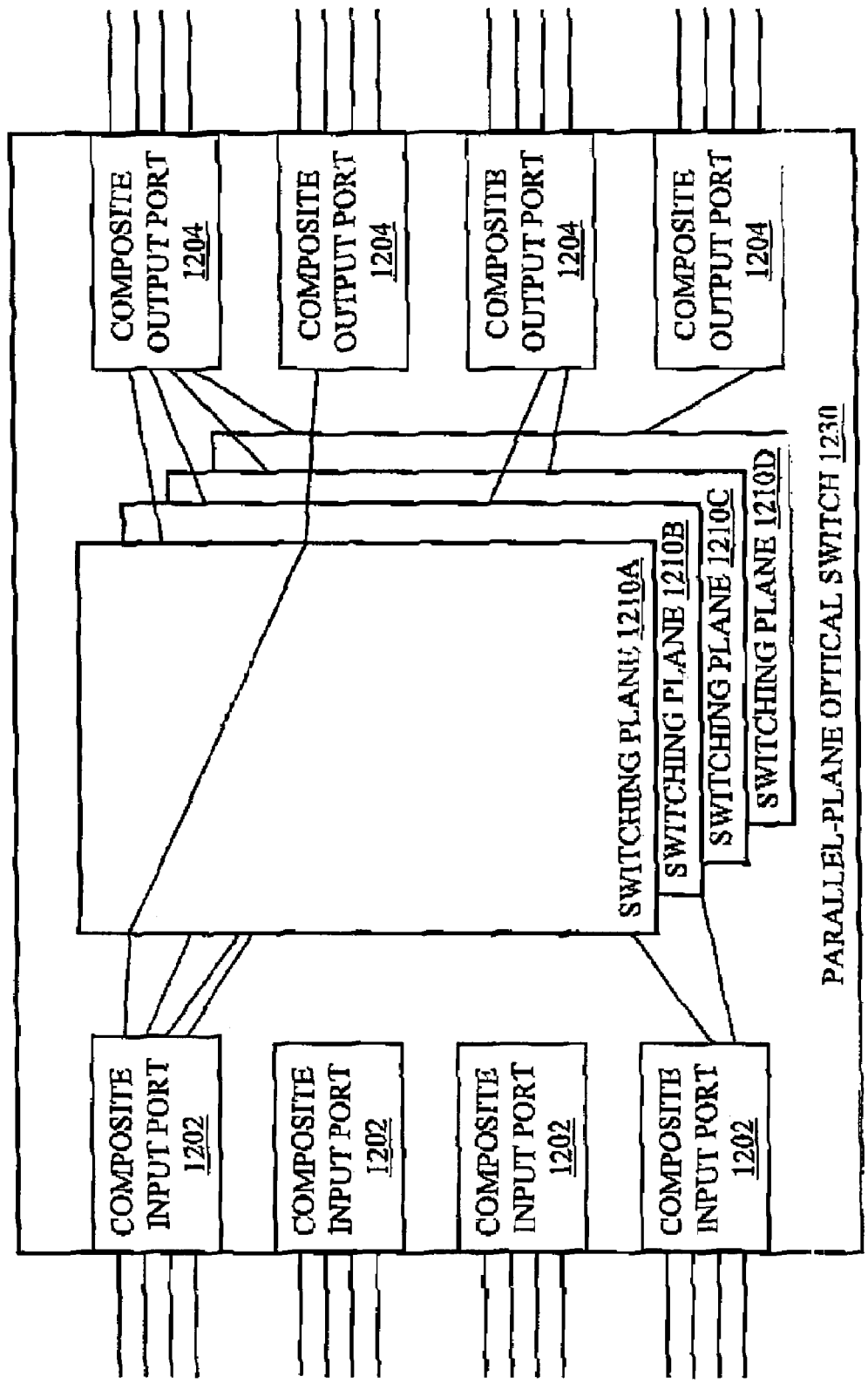
FIG. 12 schematically illustrates a known parallel-plane optical switch.

In the network 600 of FIG. 6, the core nodes 640 may be provided with parallel switching planes, to be discussed in greater detail in conjunction with FIG. 12. Where a particular core node 640 is provided with parallel switching planes, there may be more than one switching plane that may be used to satisfy a connection request received from a given shell node 606. Even though two routes from the given shell node 606 to a particular shell node 606 may use the same core node 640, the routes may be considered different if the two routes use different switching planes within the core node 640. The switching planes may be identified by an index called "depth", which indicates a proximity to a reference switching plane. When comparing two or more routes in a route set, the depth of the switching plane used by each route may be included to enhance the calculation of the merit criterion. The objective here is to provide a viable spatial packing function of the parallel switching planes to reduce the incidence of mismatch of free input ports and free output ports.

Network Capacity

A high-capacity fast-switching optical shell node can be constructed from medium-size switch modules as described in U.S. patent application Ser. No. 10/223,222 filed on Aug. 20, 2002 and titled "Modular High-Capacity Switch". Using 64×64 switch modules, a shell node having about 1,000 input ports and 1,000 output ports can be configured. The core nodes need not use fast switches.

The capacity of the network 400 of FIG. 4 is determined by the shell nodes 406 and is, generally, quite limited. Using high-capacity shell nodes having 1,024 input and 1,024 output ports each, dividing the input ports into 448 inlet ports and 576 inbound ports, dividing the output ports likewise into 448 outlet ports and 576 outbound ports and using WDM fiber links of 32 wavelength channels each, the inbound ports can connect to 18 inbound fiber links and the outbound ports can connect to 18 outbound fiber links. The maximum number of shell nodes 406 in a mesh structure similar to that of FIG. 4 is then 19 and the total number of inlet ports or outlet ports that interface with the edge nodes is then 19×448=8,512. At 10 Gb/s per wavelength channel, the total capacity of the network is then about 85 Terabits per second.

The capacity of the network 600 of FIG. 6 is determined by the shell nodes 606 and the core nodes 640. Prior-art high capacity slow switching nodes have already been prototyped. Each core node 640 preferably comprises a relatively large number of parallel switching planes. The number of switching planes per core node 640 should be large enough to exploit WDM fiber-link economy, and small enough to permit the use of several geographically distributed core nodes 640, thus reducing the total fiber-link lengths. Basically, the set of core nodes 640 can be viewed as a generic single core node having a number of switching planes equal to the number of inner ports of the shell node 606 of least number of inner ports. With each shell node 606 having 512 inner ports, for example, the generic core node would have 512 switching planes. With each switching plane having 1,024 input ports and 1,024 output ports, and with each port adapted to couple to a channel modulated at 10 Gb/s, the capacity of the generic core node becomes about 5 petabits per second. Subsets of the parallel switching planes of the generic core node, each provided with a core controller 650, constitute the geographically distributed core nodes 640.

Shell Lattice Structure

To realize a much higher capacity and a much wider coverage, a multiplicity of individual networks, each having the mesh structure of FIG. 4 or FIG. 6, can be arranged in a lattice structure where the shell nodes are arranged so that each shell node is a member of two networks. A lattice structure based on edge node interconnection is described in Applicant's U.S. patent application Ser. No. 09/624,079 filed on Jul. 24, 2000, and titled "Multi-dimensional Lattice Network". This structure can be adapted, as illustrated in FIGS. 9 and 10, to extend the networks of FIG. 4 or FIG. 6 by interconnecting the shell nodes in a lattice arrangement.

Figure 9:
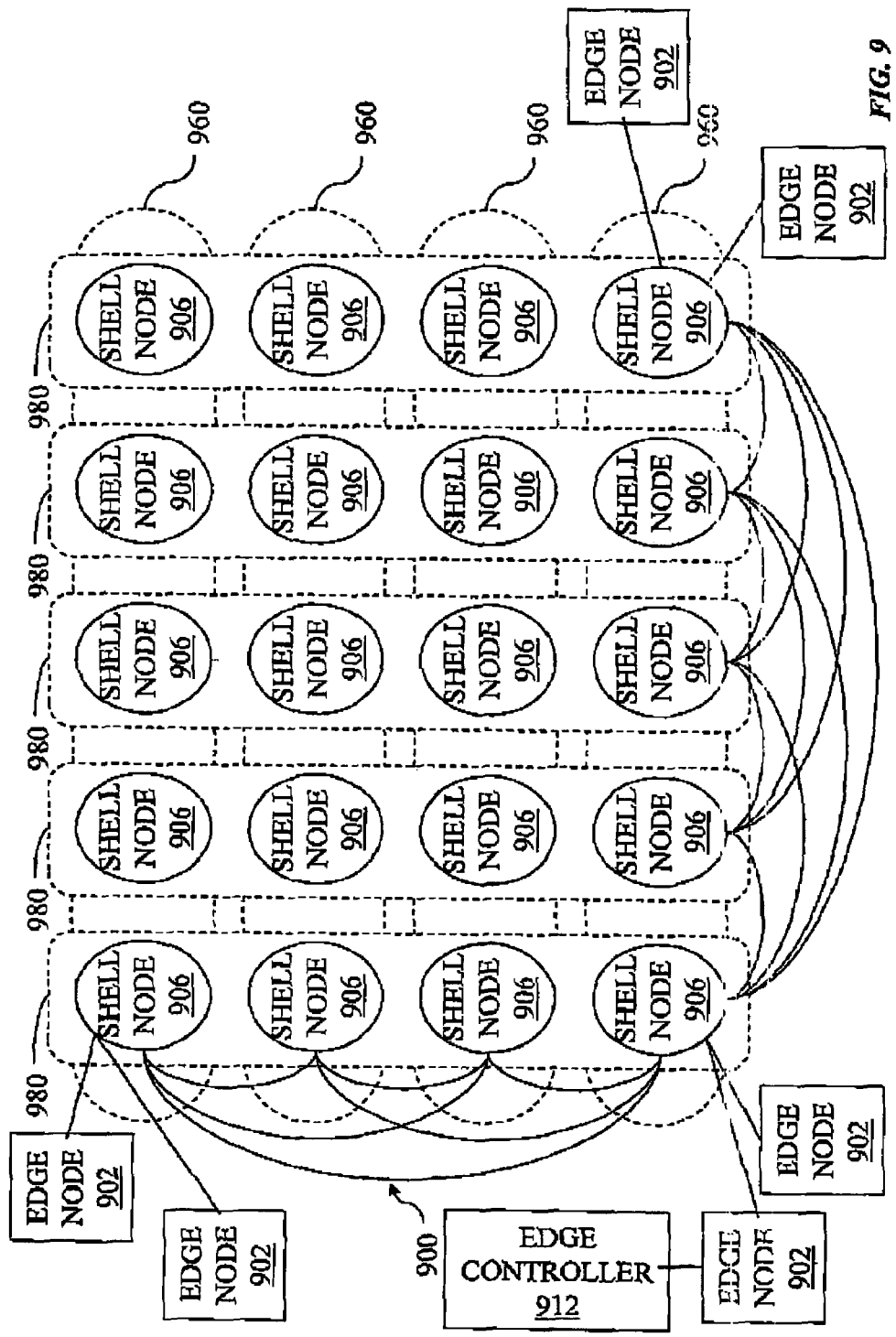
FIG. 9 illustrates a two-dimension lattice shell layer in a network adapted to combine fine and coarse carrier switching according to an embodiment of the present invention wherein shell nodes are connected directly as in the network of FIG. 4.
Figure 10:
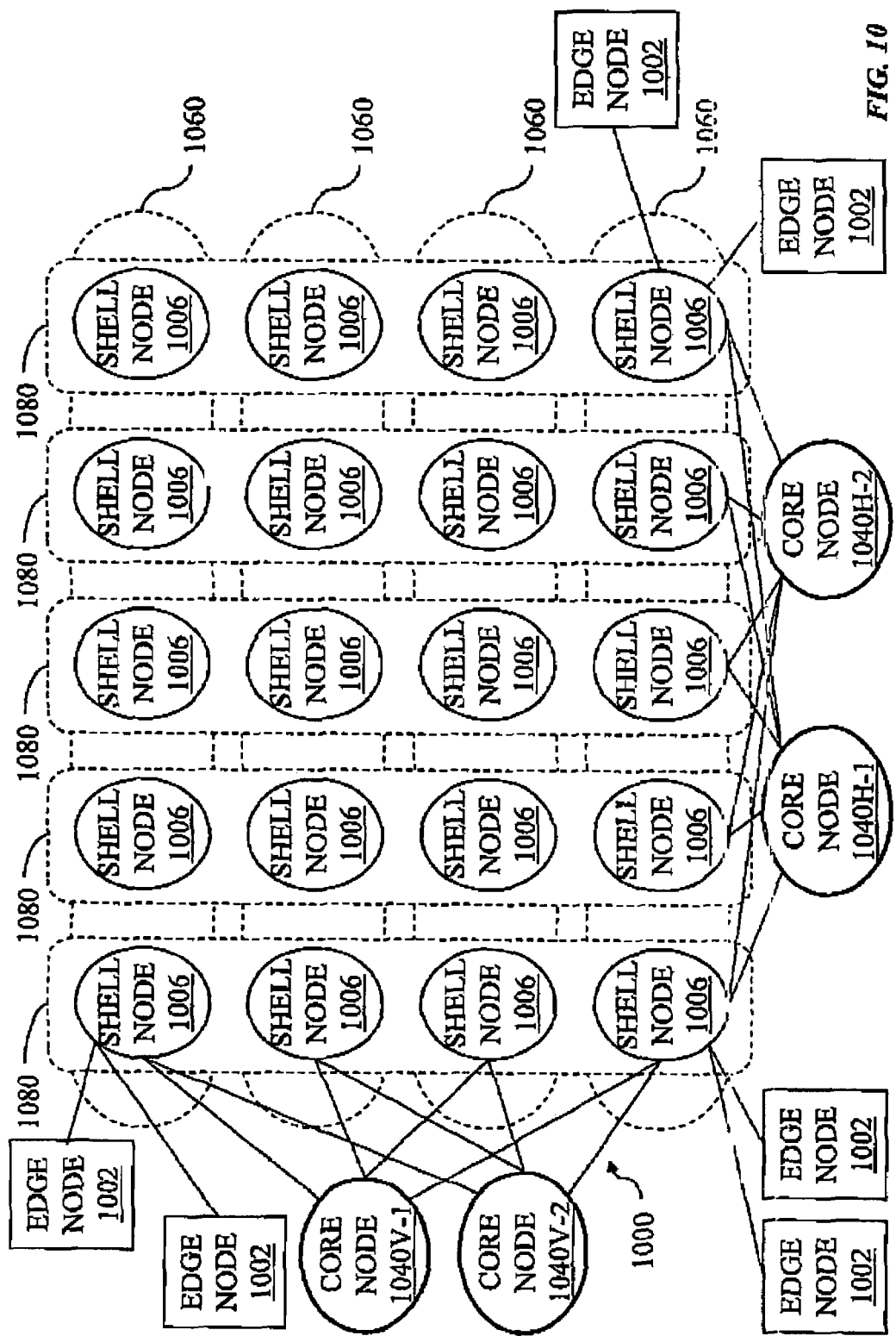
FIG. 10 illustrates a two-dimension lattice shell layer in a network adapted to combine fine and coarse carrier switching according to an embodiment of the present invention wherein shell nodes are connected via core nodes as in the network of FIG. 6.

FIG. 9 illustrates a first lattice network 900 whose lattice structure is defined by N "horizontal" networks 960 of the type illustrated in FIG. 4, i.e., wherein the shell nodes connect to each other directly. Each of the N horizontal networks 960 includes a number of shell nodes 906. A number of edge nodes 902 subtend from each of the shell nodes 906. A few exemplary edge nodes 902 and an exemplary edge controller 912 are illustrated in FIG. 9. The shell nodes 906 of a given horizontal network 960 are connected directly to each other as illustrated in the lowermost horizontal network 960 of FIG. 9.

To form a lattice, a number "vertical" networks 980 are also formed. To form a given vertical network 980, one shell node 906 from each horizontal network 960 may be designated as part of the given vertical network 980 and connected to each other shell node 906 in the given vertical network 980. Connections between the shell nodes 906 are shown for the leftmost vertical network 980 and understood to be present in the remaining vertical networks 980.

At least one vertical network 980 is formed by interconnecting a shell node 906 from each of the N horizontal networks 960. FIG. 9 illustrates a "full" lattice network having M vertical networks 980, where M is the number of shell nodes 906 in each of the horizontal networks 960. Each shell node 906 belongs to one horizontal network 960 and one vertical network 980.

With M=12 and N=10, for example, and using shell nodes 906 having 1,024 input and 1,024 output ports each, the input ports may be divided into 352 inbound ports (11 links) receiving traffic from (M−1) shell nodes belonging to a horizontal network 960, 288 inbound ports (9 links) receiving traffic from (N−1) shell nodes of a vertical network 980, and the remaining 384 ports are inlet ports. The total capacity of a lattice network is found by multiplying the number of shell nodes 906 (M×N=120) by the number of inlet ports (384) and by the bit rate capacity of the inter-shell node channels. The capacity of a channel connecting any two shell nodes is herein considered to be equal to the capacity of a port of a shell node, all shell-node ports having the same capacity. For this example, consider the bit rate capacity of the inter-shell node channels to be 10 Gb/s, giving a total access capacity of $120 \times 384 \times 10 \times 10^9 = 460.8$ Tb/s. The access capacity is the capacity available to the data sources.

Where networks of the type presented in FIG. 6 are connected as the horizontal network in a lattice network, a second lattice network 1000, illustrated in FIG. 10, is the result. In FIG. 10, each of the horizontal networks 1060 includes a number of shell nodes 1006. As illustrated in FIG. 10, the shell nodes 1006 connect to each other via horizontal core nodes 1040H. Exemplary core nodes 1040H-1, 1040H-2 are illustrated for the lowermost horizontal network 1060. It should be understood that each horizontal network 1060 has corresponding horizontal core nodes 1040. A few exemplary edge nodes 1002 are illustrated in FIG. 10.

To form a lattice, a number vertical networks 1080 are also formed. To form a given vertical network 1080, one shell node 1006 from each horizontal network 960 may be designated as part of the given vertical network 1080 and connected to each other shell node 1006 in the given vertical network 1080 via one or more vertical core nodes 1040V. Connections between the shell nodes 1006, via vertical core nodes 1040V-1, 1040V-2 are shown for the leftmost vertical network 1080 and understood to be present in the remaining vertical networks 1080.

Consider using the horizontal networks 1060 of FIG. 10 instead of the horizontal networks 960 of FIG. 9. In particular, consider a case wherein the core nodes 1040 have 512 switching planes and each switching plane is of dimension 1,024×1,024. Each such switching plane may connect up to 1,024 optical shell nodes 1006. Each shell node 1006 may be considered to have 1,024 input ports and 1,024 output ports as described above with reference to FIG. 9. A lattice network having the above described qualities may accommodate a maximum of one million shell nodes 1006 and give rise to a total access capacity of 3,800 Pb/s, i.e., about one million times the access capacity of the current Internet.

Network Design

Figure 11:
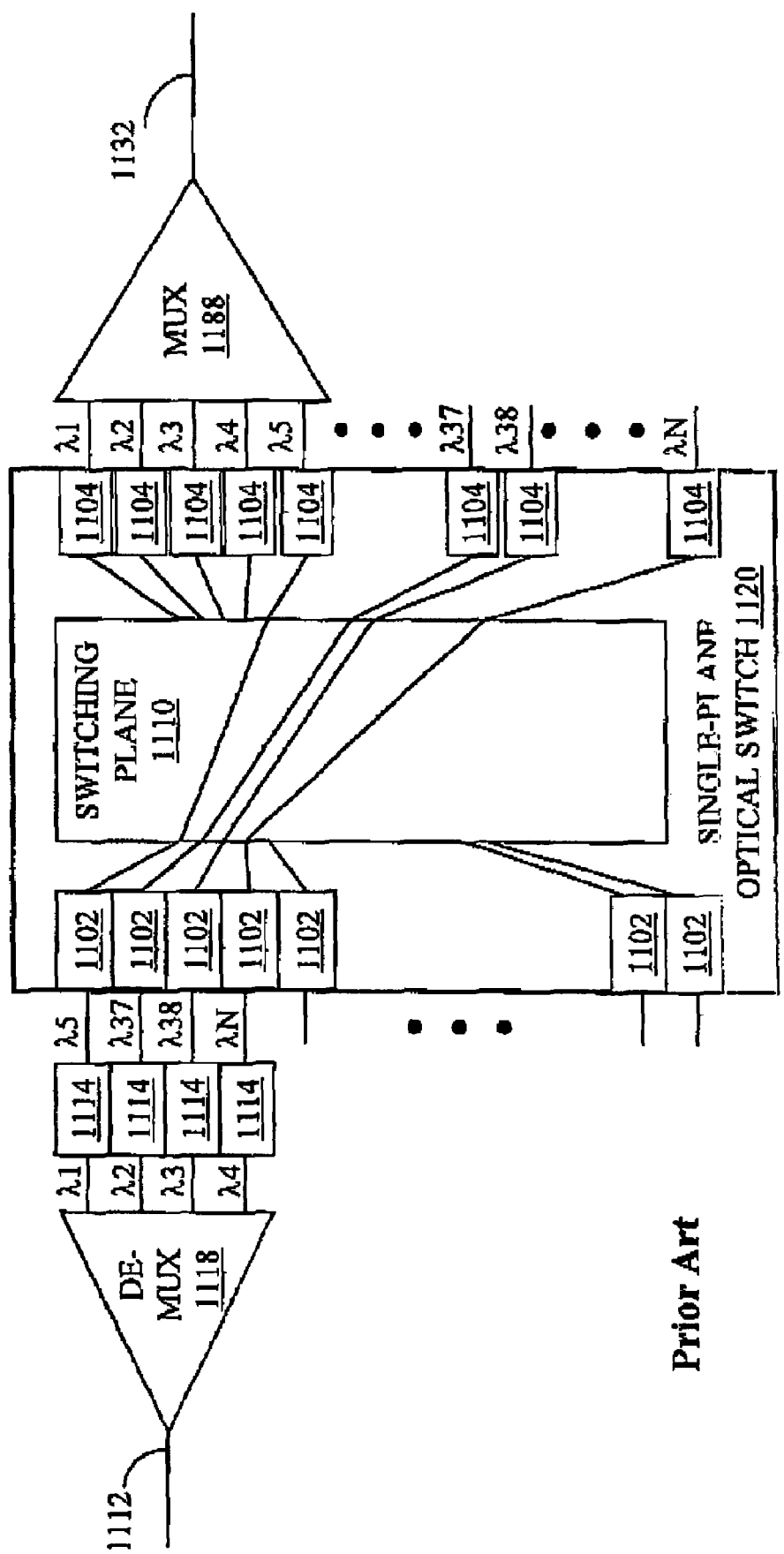
FIG. 11 schematically illustrates a known single-plane optical switch.

FIG. 11 schematically illustrates a known single-plane optical switch 1120. The known single-plane optical switch 1120 includes input ports 1102 and output ports 1104. According to predetermined connection instructions, a switching plane 1110 connects specific input ports 1102 to specific output ports 1104. The known single-plane optical switch 1120 receives input from input fiber links having different numbers of wavelength channels. In the spectral multiplexing scheme called Wavelength Division Multiplexing (WDM), a number of channels each carrying a multiplex of baseband signals may be carried on a single fiber link. All wavelengths (i.e., all optical-carrier signals) are then multiplexed on a single fiber link. An exemplary input fiber link 1112 is shown. The input ports 1102 may be considered to be in groups, where each group of input ports 1102 receives wavelength channels from a single input fiber link. The groups can be of unequal size. As the input fiber links may have different numbers of wavelength channels, the groups of input ports 1102 can be of unequal size.

A signal carried by the exemplary input fiber link 1112 is demultiplexed by a demultiplexer (DE-MUX) 1118 into four wavelength channels labeled $\lambda 1$, $\lambda 2$, $\lambda 3$, $\lambda 4$. Each of these wavelengths may then be converted by a corresponding wavelength converter 1114 to the wavelength of the wavelength channel designated by the output port 1104. For instance, the wavelength channel labeled $\lambda 1$ is destined for the output port 1104 with a wavelength channel labeled $\lambda 5$. The corresponding wavelength converter 1114 acts to modify the incoming wavelength channel such that the same information is carried on the wavelength channel labeled $\lambda 5$.

Like the input ports 1102, the output ports 1104 may be arranged in groups, where each group of output ports 1104 transmits wavelength channels over a single output fiber link. As the output fiber links may have different numbers of wavelength channels, the groups of output ports 1104 can be of unequal size. An exemplary output fiber link 1132 is shown. Before transmission on the exemplary output fiber link 1132, the wavelength channels output from the corresponding output ports 1104 are multiplexed by a multiplexer (MUX) 1188.

Note that the wavelength converters may be alternatively (and preferably) placed between the output ports 1104 and the multiplexer 1188.

FIG. 12 schematically illustrates a known parallel-plane optical switch 1230 comprising a multiplicity of switching planes 1210A, 1210B, 1210C, 1210D (individually or collectively referenced as 1210) of the type of the single switching plane 1110 of FIG. 11. Each switching plane 1210 is dedicated to switching channels of a particular wavelength. The known, parallel-plane optical switch 1230 has composite input ports 1202 and composite output ports 1204. In a "uniform" parallel-plane optical switch, such as the one illustrated in FIG. 12, each composite input port 1202 contains one input port corresponding to each plane and each composite output port 1204 contains one output port corresponding to each plane.

Note that each composite input port 1202 receives an equal number (four, as shown) of wavelength channels. Similarly, each composite input port 1202 transmits an equal number of wavelength channels. This equal number is also the number of switching planes 1210. Though not shown, wavelength-channel demultiplexers are provided at the input side and wavelength-channel multiplexers are provided at the output side.

Figure 13:
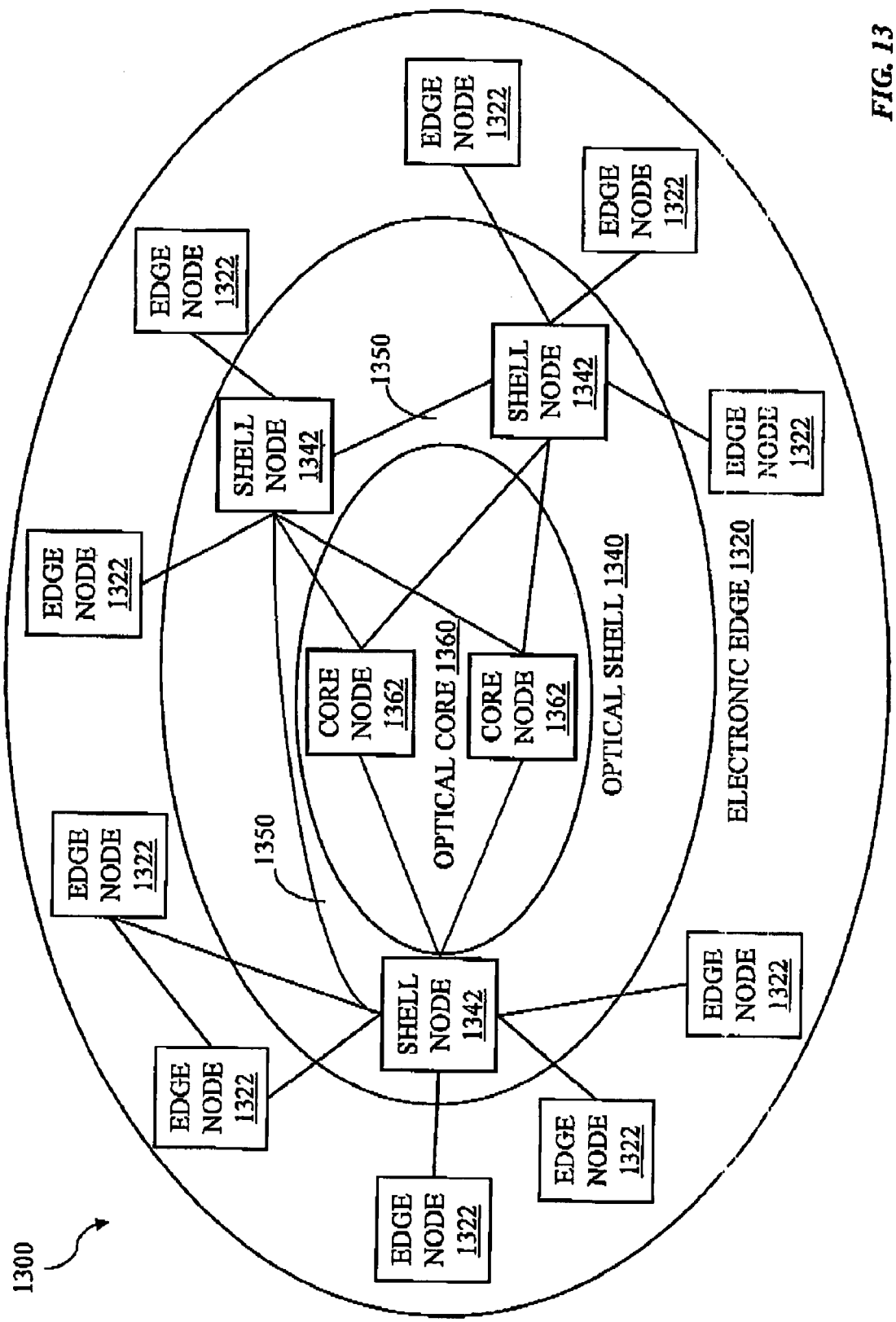
FIG. 13 illustrates a multi-layered network according to an embodiment of the present invention.

FIG. 13 abstractly illustrates a network 1300 having an electronic edge layer 1320, an optical shell layer 1340 and an optical core layer 1360. The electronic edge layer 1320 includes multiple electronic edge nodes 1322 that serve numerous clients (traffic sources and traffic sinks). The electronic edge nodes 1322 are interconnected by a core structure that includes the optical shell layer 1340 and the optical core layer 1360. The optical shell layer 1340 includes multiple shell nodes 1342, where each of the shell nodes 1342 includes a single-plane optical switch, such as the switch illustrated in FIG. 11. The optical core layer 1360 includes multiple core nodes 1362, where each of the core nodes 1362 includes a parallel-plane optical switch, such as the switch illustrated in FIG. 12. The shell nodes 1342 may interconnect directly in addition to interconnecting through the core nodes as illustrated by links 1350.

Clients supported by the same electronic edge node 1322 may communicate with each other via the common electronic edge node 1322. Each electronic edge node 1322 is connected to at least one shell node 1342 by an optical fiber link. The optical fiber links connecting the electronic edge node 1322 to the shell nodes 1342 of the optical shell layer 1340 need not have equal capacities, i.e., the number of wavelength channels carried may differ from one fiber link to another because the shell node is a fully-connected single-plane switch. Each shell node 1342 must, therefore, be equipped with wavelength converters at input or at output. The shell nodes 1342 of the optical shell layer 1340 are interconnected by the core nodes 1362 in the optical core layer 1360.

If a first electronic edge node 1322 and a second electronic edge node 1322 connect to a common shell node 1342, the two electronic edge nodes 1322 can communicate via the common shell node 1342. Where the two electronic edge nodes 1322 do not connect to a common shell node 1342, the shell node 1342 connected to the first electronic edge node 1322 can communicate with the shell node 1342 connected to the second electronic edge node 1322 via a core node 1362.

Figure 14:
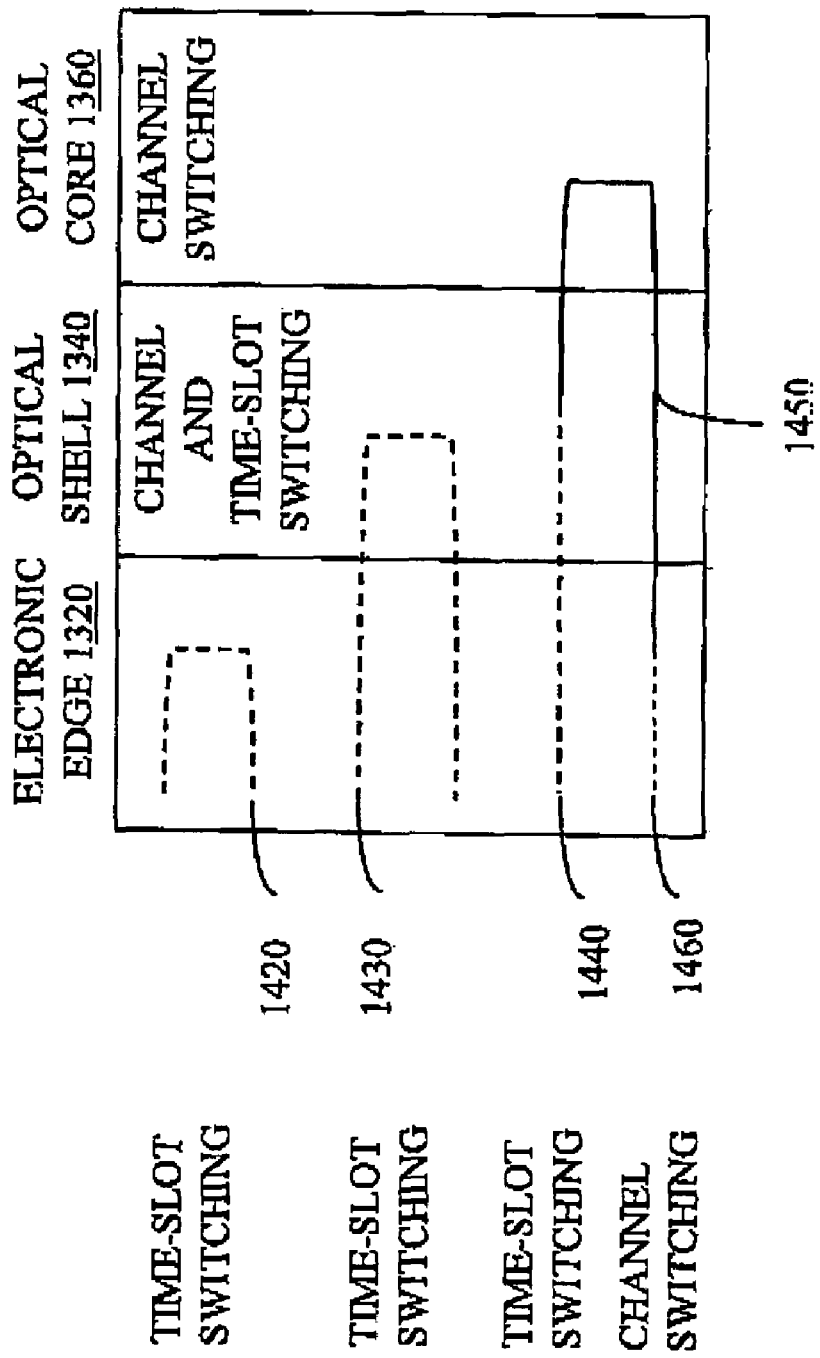
FIG. 14 illustrates a representation of different types of switching functions possible in the multi-layered network of FIG. 13.

FIG. 14 illustrates the nature of a route taken between a traffic source and a traffic sink for an intra-edge-node connection (1420), an intra-shell-node connection (1430) and an inter-shell-nodes connection (1440, 1450, 1460). A connection illustrated in a dashed line can be a time-switched connection. The inter-shell-nodes connection 1440-1450-1460 can be time switched from the traffic source to an edge node and from the edge node to a shell node, then channel-switched as a continuous optical-carrier signal through the optical core 1360 then back through the optical shell 1340. The last route segment 1460 can be time switched from an electronic edge node to the traffic sink.

Figure 15:
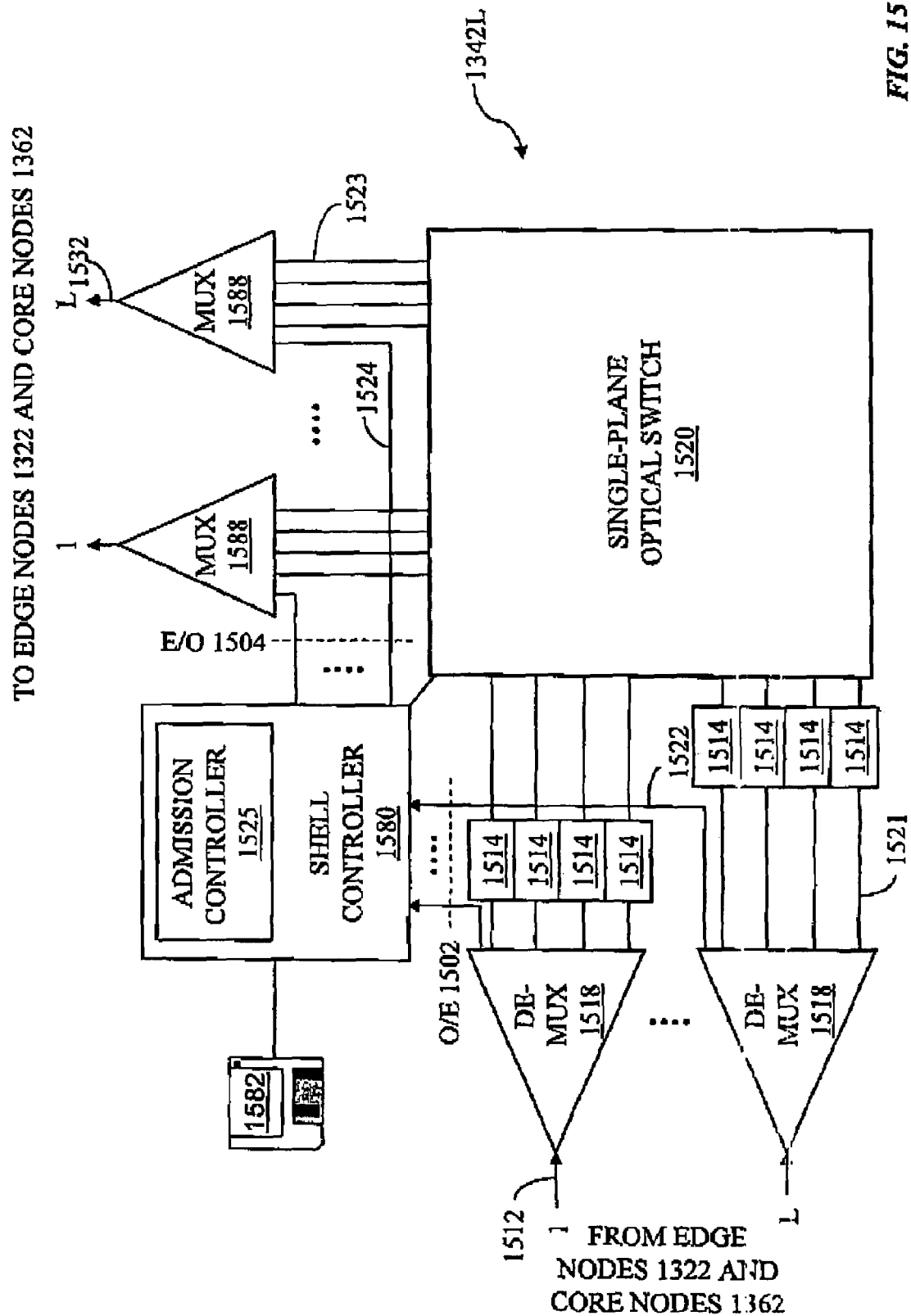
FIG. 15 illustrates a shell node that uses out-of-band signaling for use in the multi-layered network of FIG. 13 according to an embodiment of the present invention, where the shell node includes a single-plane optical switch and a corresponding shell controller.

FIG. 15 presents a first exemplary shell node 1342L adapted for out-of-band signaling. The primary element of the first exemplary shell node 1342L is a single-plane optical switch 1520 of the type of the single-plane optical switch 1120 illustrated in FIG. 11. As in FIG. 11, an input fiber link 1512 is demultiplexed at a demultiplexer 1518 into component wavelength channels that are processed by wavelength converters 1514 before being passed to the single-plane optical switch 1520 as input payload wavelength channels 1521. At the output of the single-plane optical switch 1520, groups of output payload wavelength channels 1523 are received by multiplexers 1588 where the output payload wavelength channels 1523 are multiplexed into output fiber links 1532.

The first exemplary shell node 1342L includes a shell controller 1580 for controlling the operation of the single-plane optical switch 1520. To communicate with controllers of the electronic edge nodes 1322 and the core nodes 1362, each input fiber link 1512 and output fiber link 1532 may include a control wavelength channel dedicated to carry control signals. Once demultiplexed from the input fiber link 1512, an input control wavelength channel 1522 is sent to the shell controller 1580 via an optical to electrical interface 1502. Conversely, the shell controller 1580 sends an output control wavelength channel 1524, via an electrical to optical interface 1504, to each multiplexer 1588 to be included in the signal placed on the output fiber links 1532.

The shell controller 1580 includes an admission controller 1525 that receives connection requests from edge nodes 1322 for the establishment of connections through the shell node 1342L to other edge nodes 1322. The admission controller 1525 may also receive requests from edge nodes 1322 for increases or decreases in the capacity of previously established connections, or the complete removal of previously established connections. Based on a record of the occupancy of the input ports and output ports of the single-plane optical switch 1520, the admission controller 1525 may accept or reject a given request for a capacity increase.

Each of the control functions of the shell controller 1580 can be implemented in application-specific hardware, which is the preferred implementation when high speed is a requirement. However, in an alternative implementation, the shell controller 1580 may be loaded with shell node controlling software for executing methods exemplary of this invention from a software medium 1582 which could be a disk, a tape, a chip or a random access memory containing a file downloaded from a remote source.

Figure 16:
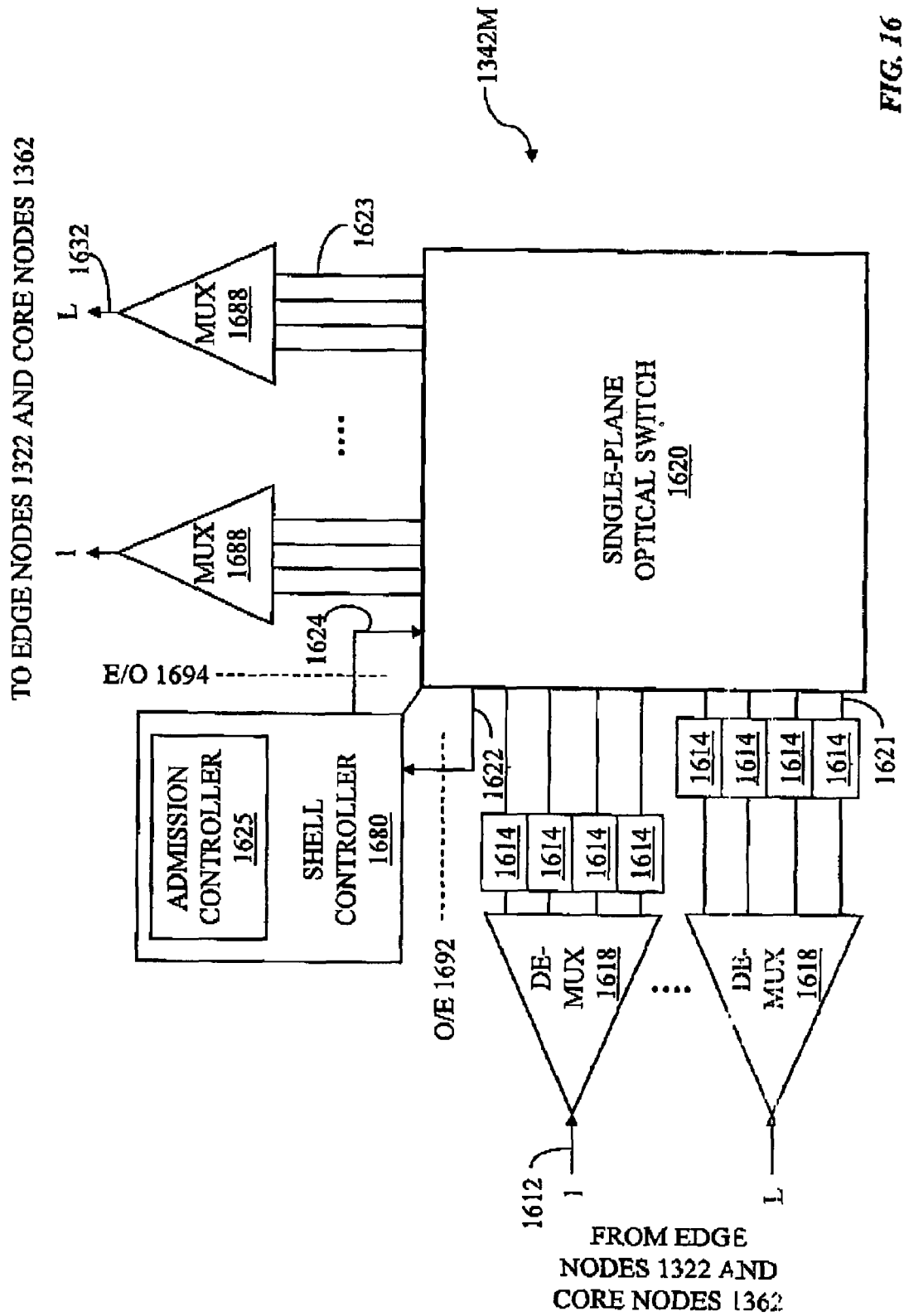
FIG. 16 illustrates a shell node that uses in-band signaling, for use in the multi-layered network of FIG. 13 according to an embodiment of the present invention.

FIG. 16 presents a second exemplary shell node 1342M adapted for in-band signaling. The primary element of the second exemplary shell node 1342M is a single-plane optical switch 1620 of the type of the single-plane optical switch 1120 illustrated in FIG. 11. As in FIG. 11, an input fiber link 1612 is demultiplexed at a demultiplexer 1618 into component wavelength channels that are processed by wavelength converters 1614 before being passed to the single-plane optical switch 1620 as input payload wavelength channels 1621. At the output of the single-plane optical switch 1620, groups of output payload wavelength channels 1623 are received by multiplexers 1688 where the output payload wavelength channels 1623 are multiplexed into output fiber links 1632.

The second exemplary shell node 1342M includes a shell controller 1680 for controlling the operation of the single-plane optical switch 1620. It is considered that the wavelength channels arriving on the input fiber links 1612 may use time division multiplexing (TDM) in addition to being wavelength division multiplexed.

In TDM, frames of information, each having a predetermined duration, are divided into time slots, each having a predetermined duration. A given edge node 1322 may send information destined for many diverse destinations in a single frame on a single wavelength channel. A schedule, which specifies a specific time slot in which to put information destined for a particular destination edge node 1322, is provided to the given edge node 1322 by the shell controller 1680. The shell controller 1680 additionally sends instructions to the single-plane optical switch 1620, which instructions correspond to the schedule provided to the given edge node 1322.

A process of time-locking is described in Applicant's U.S. patent application Ser. No. 10/054,509 referenced hereinbefore. With time locking, all edge nodes subtending directly to a shell node can time their transmission to arrive at the optical shell node at any desired instant of time. An edge node can time-lock to each of several shell nodes or core nodes to which the edge node directly connects.

As a result of the use of TDM, a dedicated control channel is not required for controllers of the electronic edge nodes 1322 and core nodes 1362 to communicate with the shell controller 1680. Instead, control information may be received in scheduled control time slots which are switched, by the single-plane optical switch 1620 toward the shell controller 1680 on an input control channel 1622. Advantageously, the control time slots are arranged by the shell controller 1680 so that control information is only being received from one edge node 1322 at a time. In passing from the single-plane optical switch 1620 to the shell controller 1680 on the input control channel 1622, the control information passes through an optical to electrical interface 1692. Similarly, in passing from the shell controller 1680 to the single-plane optical switch 1620 on an output control channel 1624, the control information passes through an electrical to optical interface 1694.

Like the shell controller 1580 of FIG. 15, the shell controller 1680 of FIG. 16 includes an admission controller 1625.

Figure 17:
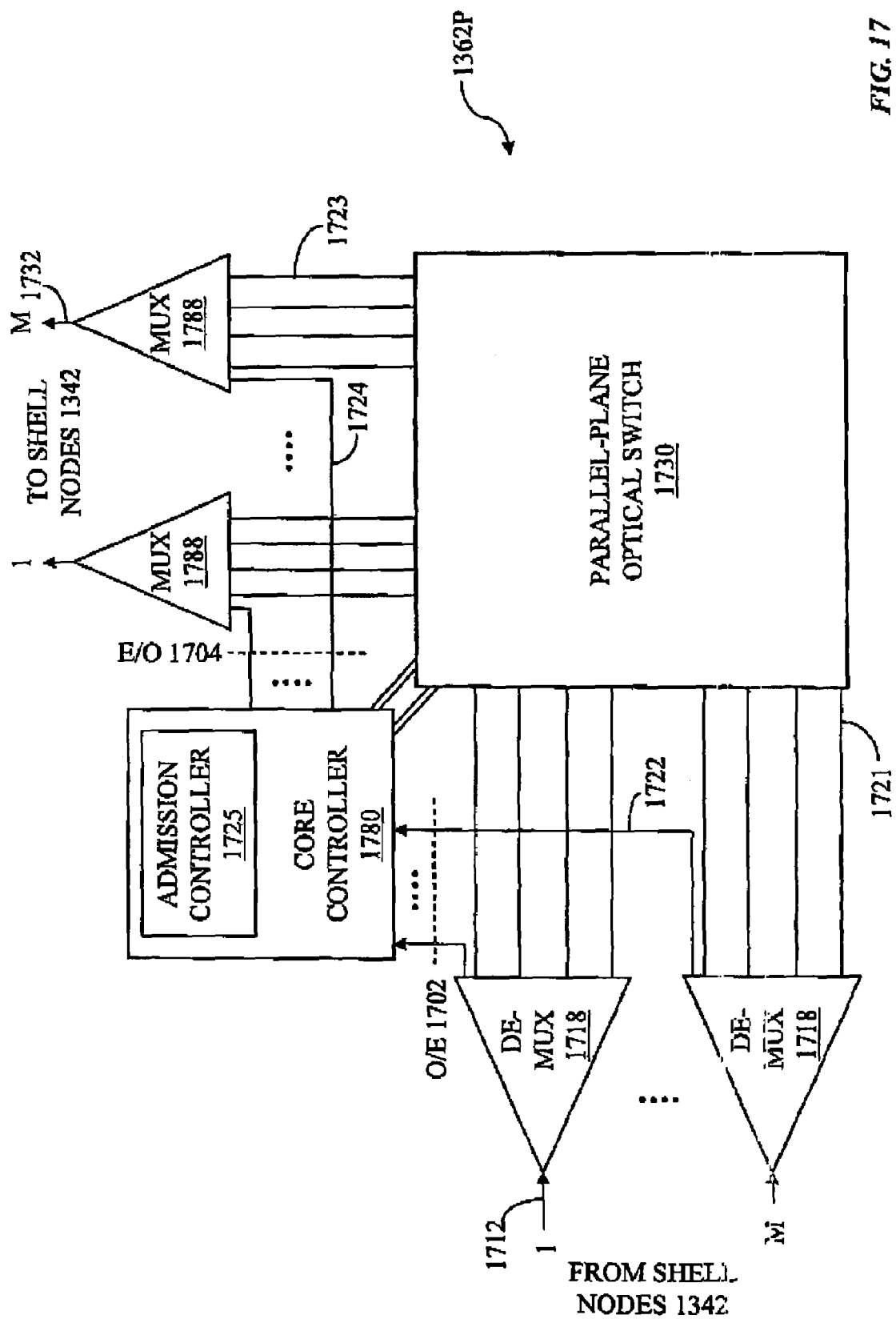
FIG. 17 illustrates an optical core node that uses out-of-band signaling for use in the multi-layered network of FIG. 13 according to an embodiment of the present invention, where the optical core node includes a parallel-pane optical switch and a corresponding core controller.

FIG. 17 presents a first exemplary core node 1362P adapted for out-of-band signaling. The primary element of the first exemplary core node 1362P is a parallel-plane optical switch 1730 of the type of the parallel-plane optical switch 1230 illustrated in FIG. 12. An input fiber link 1712 is demultiplexed at a demultiplexer 1718 into component wavelength channels that are passed to the parallel-plane optical switch 1730 as input payload wavelength channels 1721. At the output of the parallel-plane optical switch 1730, groups of output payload wavelength channels 1723 are received by multiplexers 1788 where the output payload wavelength channels 1723 are multiplexed into output fiber links 1732.

The first exemplary core node 1362P includes a core controller 1780 for controlling the operation of the parallel-plane optical switch 1730. To communicate with controllers of the shell nodes 1342, each input fiber link 1712 and output fiber link 1732 may include a control wavelength channel. Once demultiplexed from the input fiber link 1712, an input control wavelength channel 1722 is sent to the core controller 1780 via an optical to electrical interface 1702. Conversely, the core controller sends an output control wavelength channel 1724, via an electrical to optical interface 1704, to each multiplexer 1788, such that the output control wavelength channel 1724 is included in the signal placed on the output fiber links 1732.

The core controller 1780 includes an admission controller 1725 that receives channel switching requests from shell nodes 1342 for the establishment of connections through the first exemplary core node 1362P. The admission controller 1725 may also receive requests from shell nodes 1342 for increases or decreases in the capacity of previously established connections, or the complete removal of previously established connections. A connection comprises an integer number of wavelength channels. Based on a record of the occupancy of the input ports and output ports of the parallel-plane optical switch 1730, the admission controller 1725 may accept or reject capacity-increment requests.

Note that, for in-band signaling, there must be time locking between the device that is transmitting the signaling and the device that is receiving the signaling. It follows that a core node cannot receive in-band signaling from a shell node, because the shell node is time locked only to its subtending edge nodes. Consequently, if a core node is to receive in-band signaling, the signaling must be received directly from an edge node. A direct connection between an edge node and a core node is further discussed in conjunction with FIG. 29. In the meantime, a core node connected in this way is contemplated in FIG. 18.

Figure 18:
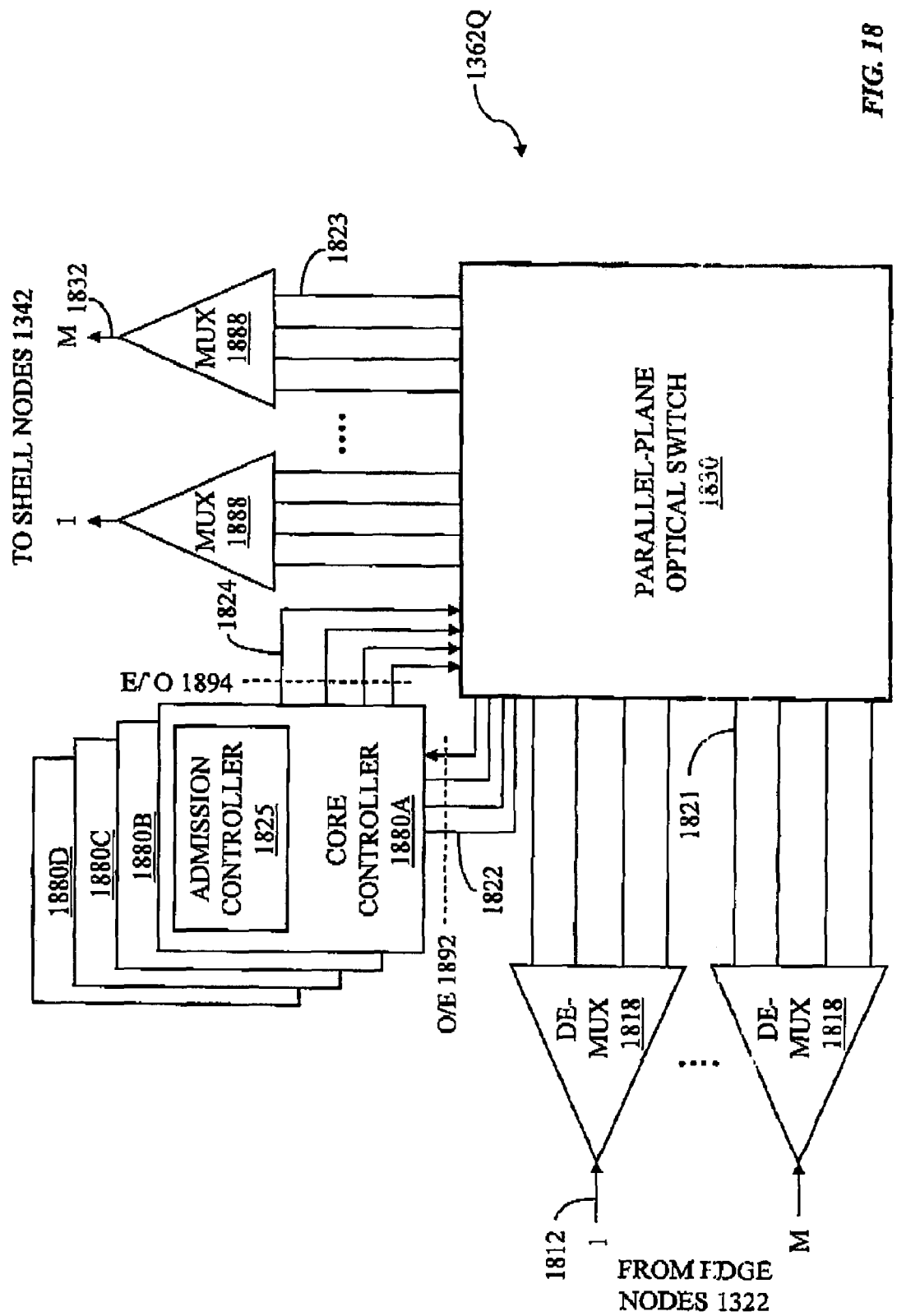
FIG. 18 illustrates an optical core node that uses in-band signaling according to an embodiment of the present invention.

FIG. 18 presents a second exemplary core node 1362Q adapted for in-band signaling. The primary element of the second exemplary core node 1362Q is a parallel-plane optical switch 1830 of the type of the parallel-plane optical switch 1230 illustrated in FIG. 12. An input fiber link 1812, from an edge node 1322, is demultiplexed at a demultiplexer 1818 into component wavelength channels passed to the parallel-plane optical switch 1830 as input payload wavelength channels 1821. At the output of the parallel-plane optical switch 1830, groups of output payload wavelength channels 1823 are received by multiplexers 1888 where the output payload wavelength channels 1823 are multiplexed into output fiber links 1832.

It is considered that the wavelength channels arriving on the input fiber links 1812 use time division multiplexing (TDM) in addition to being wavelength division multiplexed. The computation complexity required for a creation of a schedule of operating each switching plane (not shown) in the parallel-plane optical switch 1830 in TDM mode is high. Consequently, a distinct core controller 1880A, 1880B, 1880C, 1880D (collectively or individually referenced as 1880) may be provided that corresponds to each of the switching planes. Although the scheduling of switching is divided among multiple core controllers 1880, admission control is performed by a single admission controller 1825.

As the input wavelength channels use WDM, control information in control time slots may be passed to appropriate core controllers 1880 from the parallel-plane optical switch 1830 over a corresponding input control channel 1822. An input control channel 1822 is associated with each switching plane and carries control signals received from all incoming wavelength channels. As in the case of the single-plane optical switch 1620, the control time slots are arranged by the core controllers 1880 so that control information is only being received from one edge node 1322 at a time. In passing from the parallel-plane optical switch 1830 to the core controllers 1880 on the input control channels 1822, the control information passes through an optical to electrical interface 1892. Similarly, in passing from the core controllers 1880 to the parallel-plane optical switch 1830 on an output control channel 1824, the control information passes through an electrical to optical interface 1894.

Figure 19:
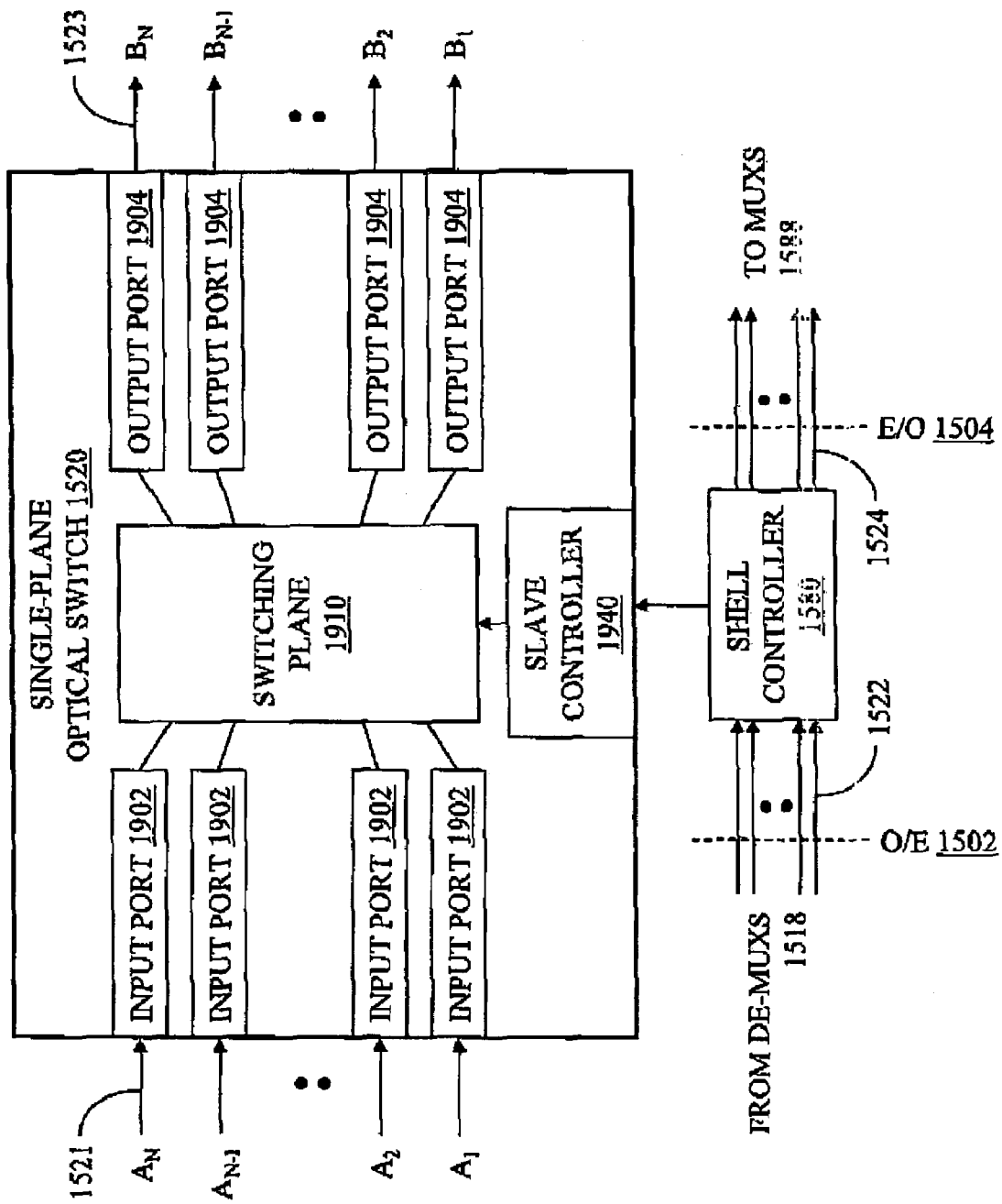
FIG. 19 illustrates the interplay between the single-plane optical switch of FIG. 15 and the corresponding shell controller according to an embodiment of the present invention.

A view of the interplay between the single-plane optical switch 1520 of FIG. 15 and the corresponding shell controller 1580 is illustrated in FIG. 19. The single-plane optical switch 1520 includes a slave controller 1940 in communication with a switching plane 1910 and the shell controller 1580. The switching plane 1910 receives input from input ports 1902 and switches signals to output ports 1904. The shell controller 1580, as illustrated in FIG. 15, communicates with edge nodes 1322 and core nodes 1362 via demultiplexers 1518 and multiplexers 1588.

Figure 20:
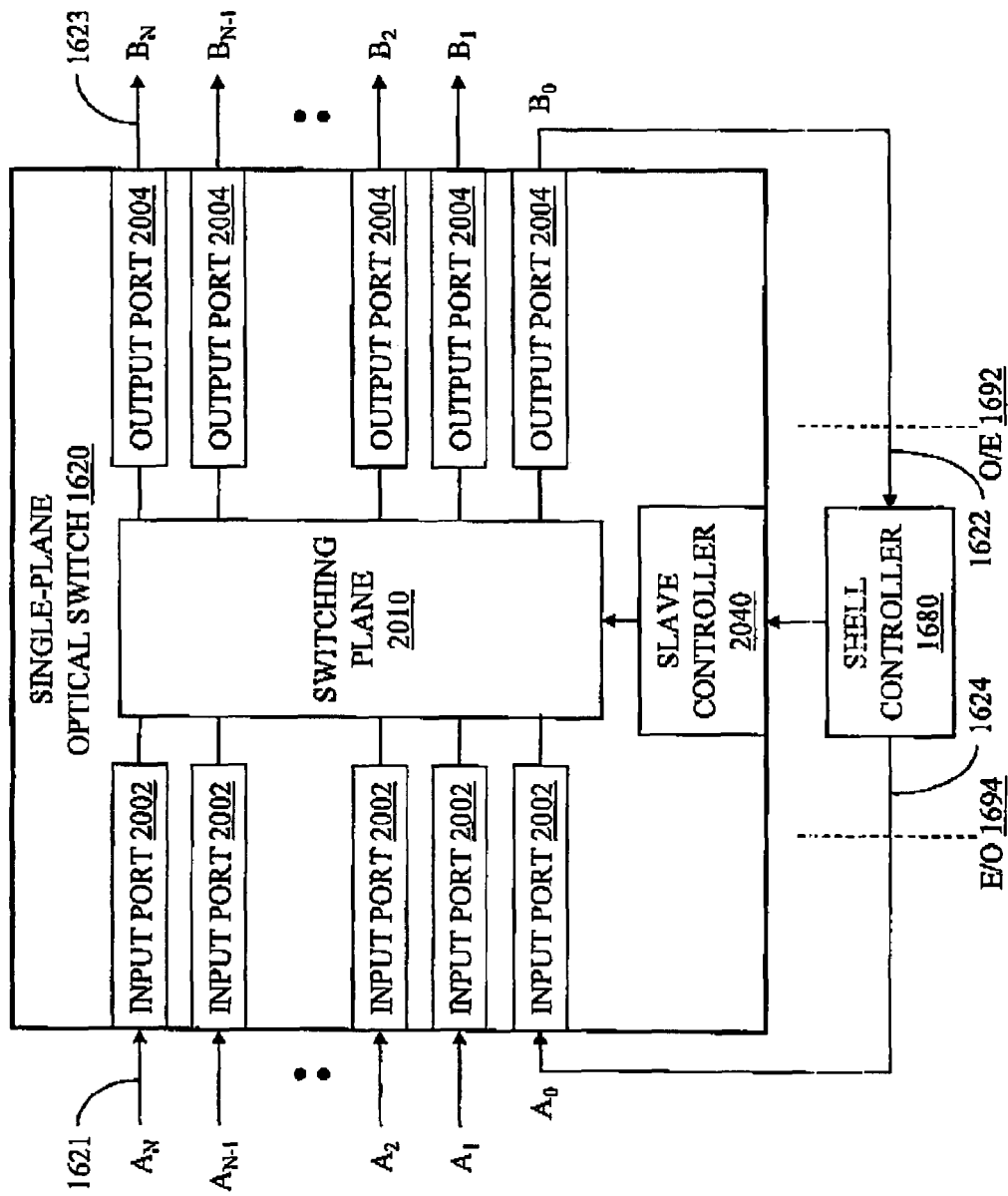
FIG. 20 illustrates the interplay between the single-plane optical switch of FIG. 16 and the corresponding shell controller according to an embodiment of the present invention.

A view of the interplay between the single-plane optical switch 1620 of FIG. 16 and the corresponding shell controller 1680 is illustrated in FIG. 20. The single-plane optical switch 1620 includes a slave controller 2040 in communication with a switching plane 2010 and the shell controller 1680. The switching plane 2010 receives input from input ports 2002 and switches signals to output ports 2004. The shell controller 1680, as illustrated in FIG. 16, communicates with edge nodes 1322 and core nodes 1362 via the single-plane optical switch 1620. Consequently, the single-plane optical switch 1620 of FIG. 16 has one more input port 2002 and one more output port 2004 than the single-plane optical switch 1520 of FIG. 15. The extra ports being dedicated to receiving from, and transmitting to, the shell controller 1680.

Figure 21:
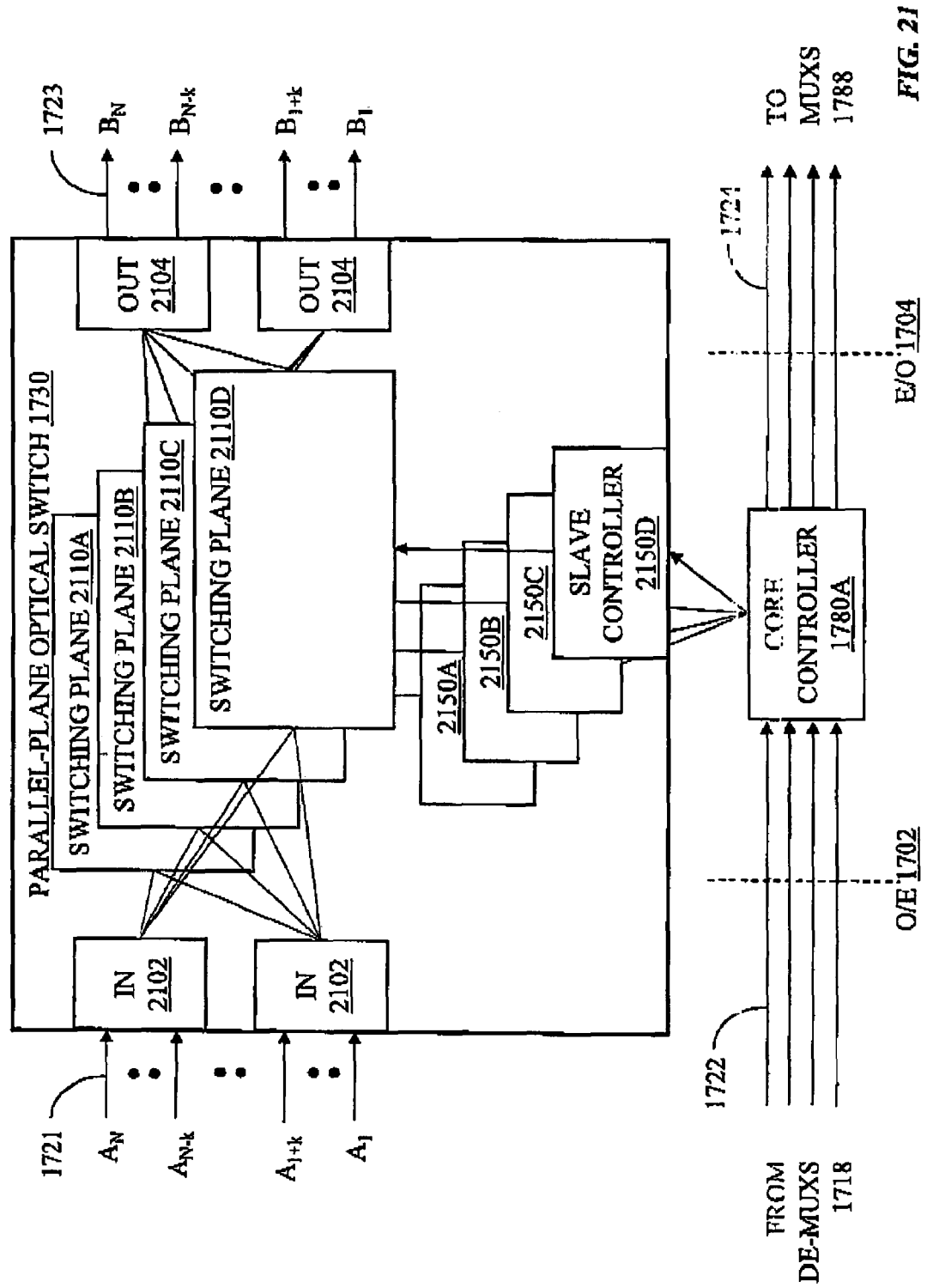
FIG. 21 illustrates the interplay between the parallel-pane optical switch of FIG. 17 and the corresponding core controller according to an embodiment of the present invention.

A view of the interplay between the parallel-pane optical switch 1720 of FIG. 17 and the corresponding core controller 1780 is illustrated in FIG. 21. The parallel-pane optical switch 1720 includes a slave controller 2150A, 2150B, 2150C, 2150D for each of a set parallel switching planes 2110A, 2110B, 2110C, 2110D (individually or collectively referenced as 2110). The slave controllers 2150A, 2150B, 2150C, 2150D are also in communication with the core controller 1780. The switching planes 2110 receive input from composite input ports 2102 and switch signals to composite output ports 2104. The core controller 1780, as illustrated in FIG. 17, communicates with shell nodes 1342 via demultiplexers 1718 and multiplexers 1788.

Figure 22:
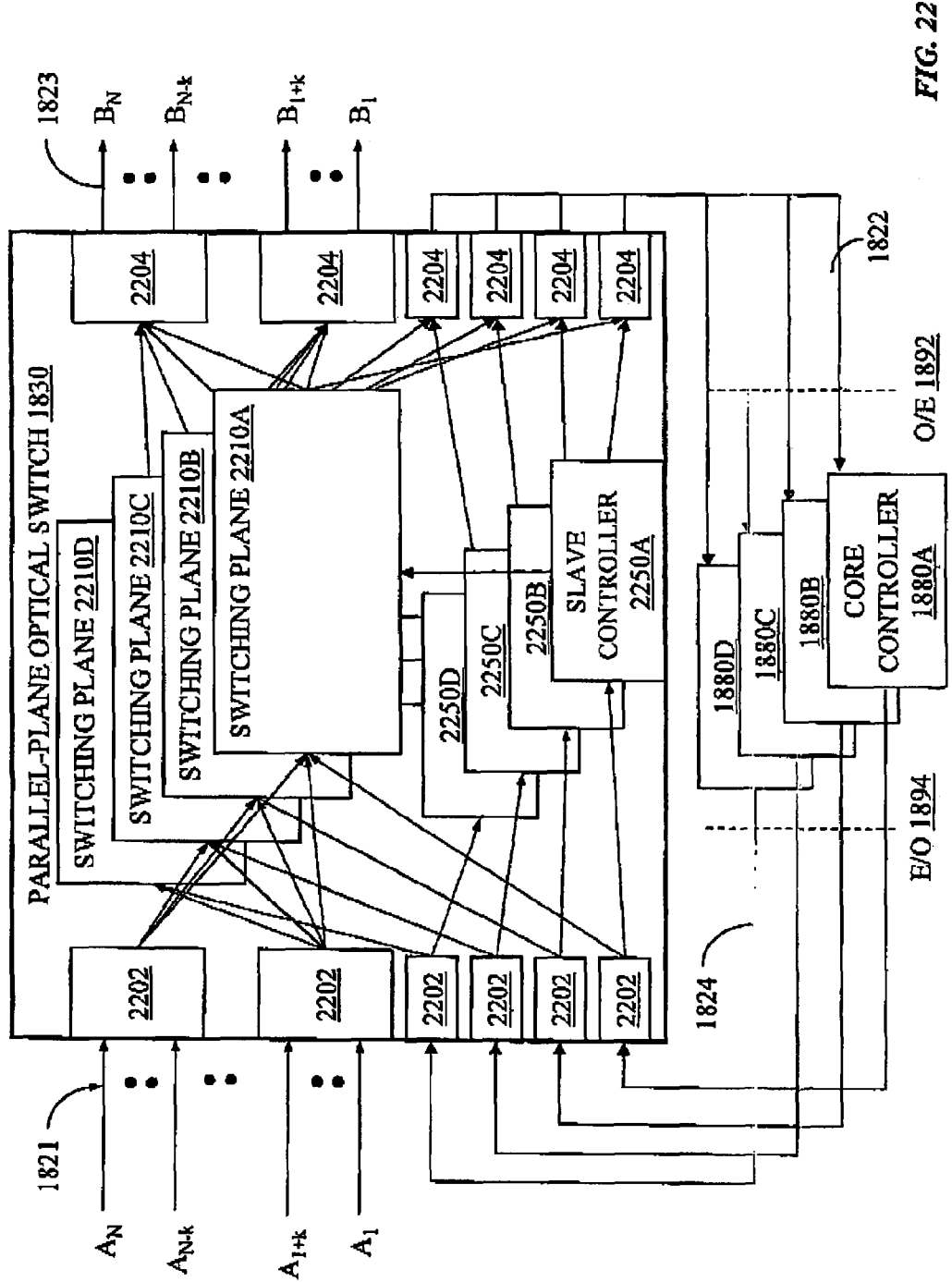
FIG. 22 illustrates the interplay between the parallel-pane optical switch of FIG. 18 and the corresponding core controller according to an embodiment of the present invention.

A view of the interplay between the parallel-pane optical switch 1830 of FIG. 18 and the corresponding core controllers 1880 is illustrated in FIG. 22. The parallel-pane optical switch 1830 includes a slave controller 2250A, 2250B, 2250C, 2250D for each of a set parallel switching planes 2210A, 2210B, 2210C, 2210D (individually or collectively referenced as 2210). The slave controllers 2250A, 2250B, 2250C, 2250D are also in communication with the core controller 1880. The switching planes 2210 receive input from composite input ports 2202 and switch signals to composite output ports 2204 (see FIG. 12, for example). The core controller 1880, as illustrated in FIG. 18, communicates with shell nodes 1342 via the parallel-pane optical switch 1830. Consequently, the parallel-pane optical switch 1830 of FIG. 22 has an additional input port 2202 and output port 2204 corresponding to each switching plane 2210. The extra ports being dedicated to receiving from, and transmitting to, the core controller 1880.

In overview, a two-layered optical core is provided for connecting edge nodes. With reference to FIG. 13, the optical shell layer 1340 is made up of shell nodes 1342 each of which include a single-plane optical switch. The optical shell layer 1340 surrounds an optical core layer 1360 that is made up of optical core nodes 1362 each of which include a parallel-pane optical switch. The two-layered approach to the optical core enables the construction of networks of higher capacities and a larger number of edge nodes in comparison with a single core layer approach, sand is coupled with a unique routing method that maximizes the probability of finding a free matching channel for a desired connection.

Figure 23:
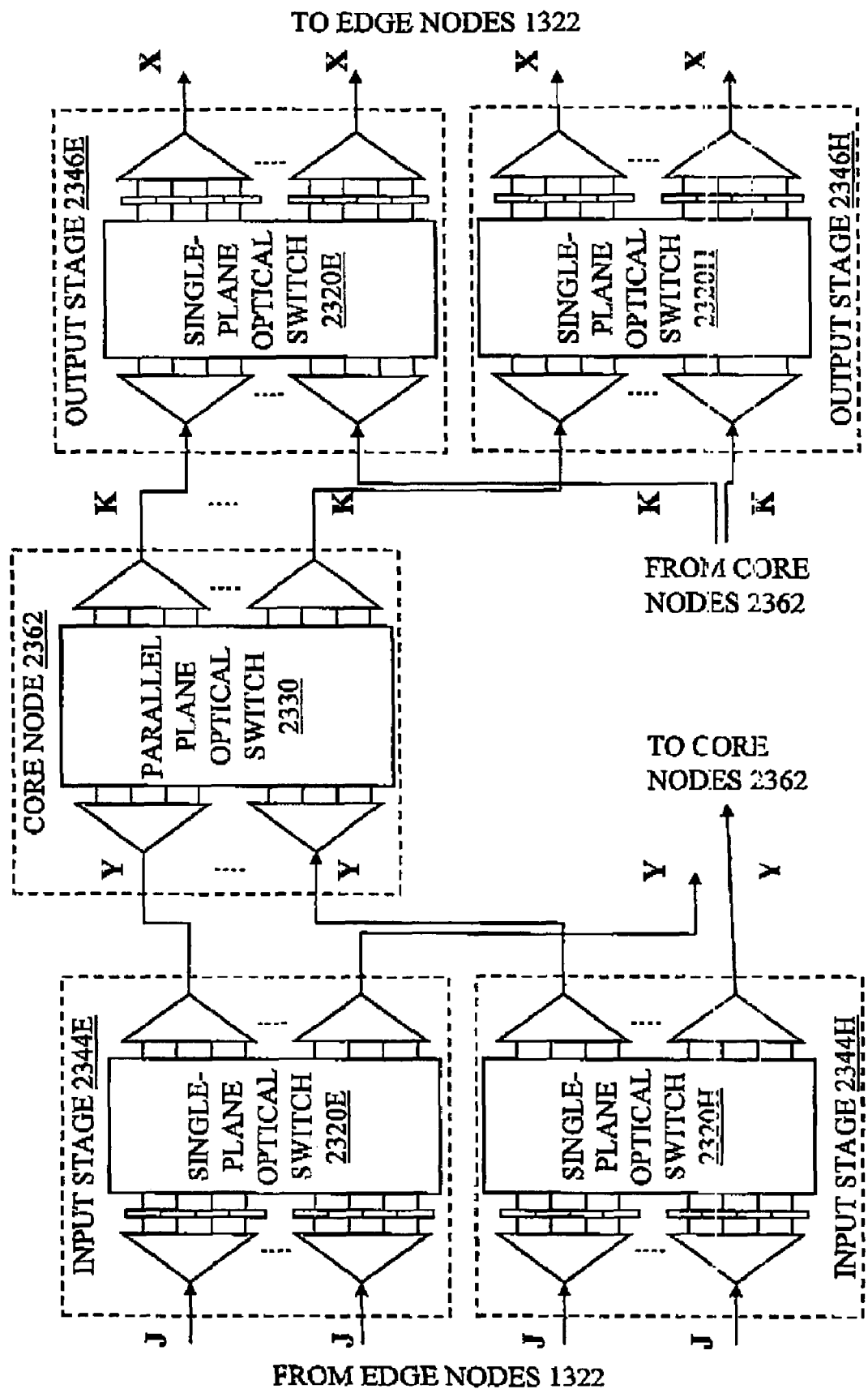
FIG. 23 illustrates a first arrangement of exemplary shell nodes and a core node in an architecture adapted from the architecture of the multi-layer network of FIG. 13.

FIG. 23 illustrates an arrangement of stages of two shell nodes and a core node 2362 (employing a parallel-plane optical switch 2330) in an architecture adapted from that of FIG. 13. A first shell node is shown as an input stage 2344E and an output stage 2346E. A second shell node is shown as an input stage 2344H and an output stage 2346H. The input and output stages of a given shell node share a single-plane optical switch 2320E, 2320H.

It may be considered that each electronic edge node 1322 (not shown in FIG. 23) comprises a source node in communication with traffic sources and a sink node in communication with traffic sinks. In which case, the input stages 2344E, 2344H receive signals from the source nodes and the output stages 2346E, 2346H transmit signals to the sink nodes.

As described with reference to FIGS. 15 and 16, each of the shell nodes is preferably constructed using a single-plane optical switch in order to enable any wavelength channel in an incoming fiber link of an arbitrary number of wavelength channels to reach any wavelength channel in any outgoing fiber link. Furthermore, the shell nodes are preferably fast switches, changing a connection in 20 nanoseconds for example, so that a TDM switching scheme, or a burst-transfer switching scheme, may be employed and, hence, each edge node 1322 may transmit to a large number of other edge nodes 1322. That is, a high "topological reach" can be realized at the shell nodes. As discussed hereinbefore, the core node preferably includes a parallel-plane optical switch to achieve a high scalability. Such core nodes are particularly well adapted to coarse-granularity carrier switching.

As described earlier, using fast switching shell nodes enables partial application of a time-sharing scheme. This requires that the source nodes and, thus, the corresponding edge nodes 1322, be time locked to the input stage 2344E, 2344H of respective shell nodes. The time locking function, however, can not easily be extended to the core node 2362 or the output stages 2346E, 2346H of other shell nodes and, hence, in such situations, each output wavelength channel from an input stage 2344E, 2344H must be switched, via the core node 2362, in its entirety to an output fiber link. Thus, in the structure of FIG. 23, time-sharing can only be implemented at the input stages 2344E, 2344H.

Figure 24:
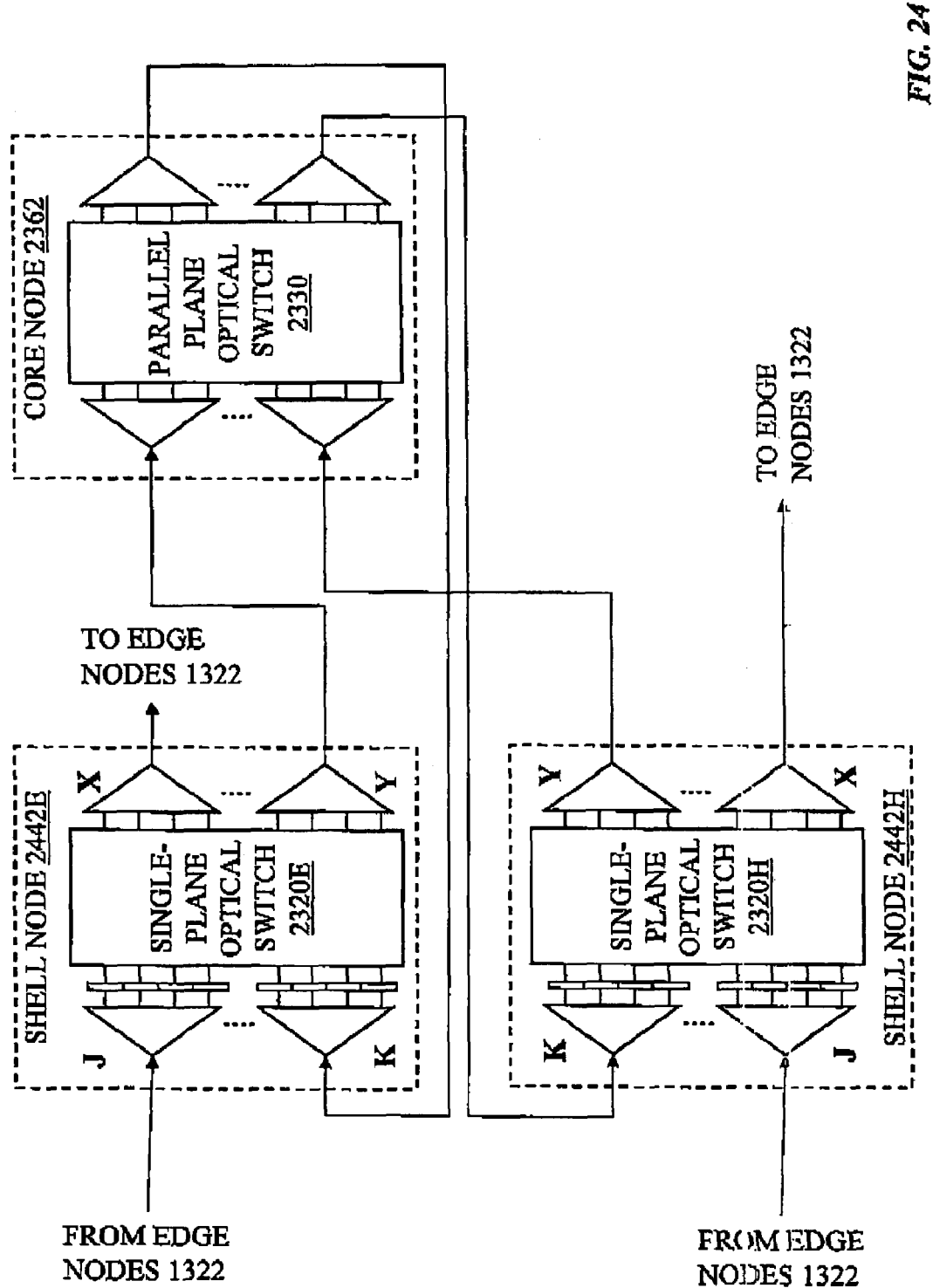
FIG. 24 illustrates a second arrangement of exemplary shell nodes and a core node in an architecture adapted from the architecture of the multi-layer network of FIG. 13.

The input stage of a shell node is typically combined with an output stage to form a complete shell node. FIG. 24 illustrates the communication between two "complete" shell nodes 2442E, 2442H and the core node 2362 of FIG. 23. Both complete shell nodes 2442E, 2442H are shown in FIG. 24 to have labels for groups of input ports and output ports.

The input port group J contains input ports connected to the source nodes that are part of the edge nodes 1322. From a review of FIG. 23, these input ports belong to the input stage 2344E, 2344H. The input port group K contains input ports connected to the core node 2362. From a review of FIG. 23, these input ports belong to the output stage 2346E, 2346H. Similarly, the output port group Y contains output ports connected to the core node 2362. From a review of FIG. 23, these output ports belong to the input stage 2344E, 2344H. The output port group X contains output ports connected to the sink nodes that are part of the edge nodes 1322. From a review of FIG. 23, these output ports belong to the output stage 2346E, 2346H.

In the folded shell node architecture (i.e., the complete shell node described hereinbefore) where the input stage shares a common switching fabric with the output stage, a TDM switching scheme or a burst switching scheme may be used in connecting source nodes to sink nodes supported by the same shell node. If a path is to be determined, in FIG. 23, from an input stage 2344E, 2344H of one shell node to an output stage 2346E, 2346H of another shell node, three free resources must be found. Consider the source-node-connected input stage to be the shell node 2344E and the sink-node-connected output stage to be the output stage 2346H. Initially, a free wavelength channel is found in the link from the input stage 2344E to the core node 2362. Then a free wavelength channel is found in the link from the core node 2362 to the output stage 2346H and a free wavelength channel is found in the link from the output stage 2346H to the sink node.

A controller of a shell node may implement a time-slot matching process, well known in the art, to locate time slots that are free at specified input and output ports.

Figure 25:
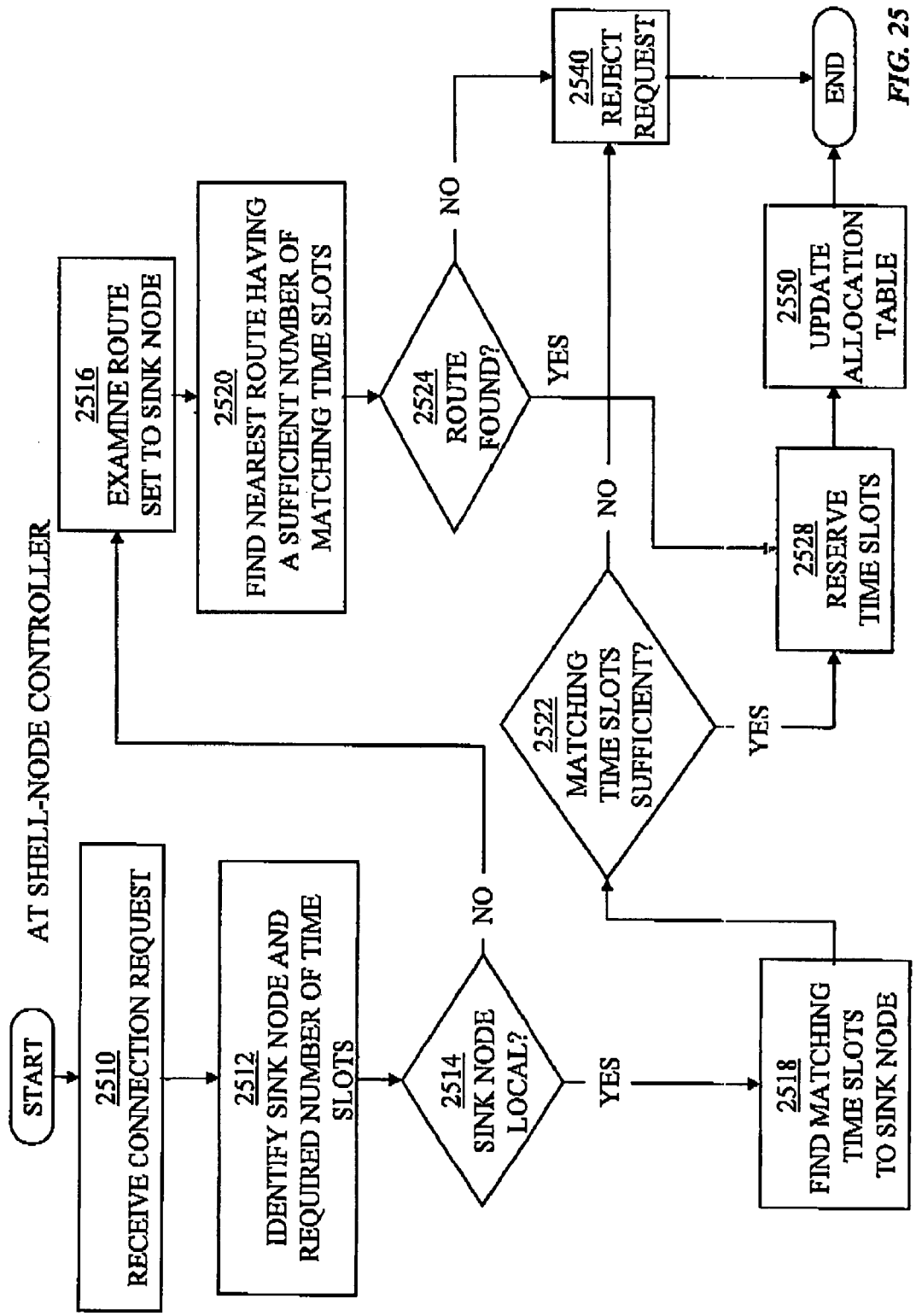
FIG. 25 illustrates, in a flow diagram, the steps of an admission control method performed at a shell controller according to an embodiment of the present invention.

A flow diagram of the steps taken in path determination by an admission controller of a shell controller of the "source" shell node that includes the input stage 2344E is illustrated in FIG. 25. A source edge node is an edge node initiating a connection request and a source shell node is a shell node to which the source edge node subtends. Likewise, a sink edge node is an edge node to which a connection is directed and a sink shell node is a shell node to which the sink edge node subtends. Initially, a connection request is received from a source node (step 2510). The admission controller extracts, from the connection request, an identity of the sink node for the connection and a requested capacity (e.g., a required number of time slots) for the connection (step 2512). A determination is then made as to whether the sink node is local (step 2514), i.e., connected to the output stage 2346E of the source shell node, or distant, e.g., connected to the output stage 2346H of another shell node. Where the sink node is local, output wavelength channels to the sink node are selected and a time-slot matching process is executed by a controller of the source shell node (step 2518), assuming the use of TDM. Where it is determined (in step 2522) that there is a sufficient number of matching time slots in the selected output wavelength channels, time slots may be reserved (step 2528) in the TDM frames that are sent by the source shell node to the sink node. Once the time slots are reserved, an allocation table maintained by the admission controller may be updated (step 2550) to reflect the reservation. Where it is determined (in step 2522) that there is insufficient number of matching time slots, the connection request is rejected (step 2540).

Where the sink node is not local, existing paths to the sink node, i.e., paths in a route set to the sink node, are examined for use by the requested connection (step 2516). Route sets are discussed hereinbefore in conjunction with FIG. 6. Notably, the existing paths may traverse the core node 2362 and the output stage 2346H of another shell node on the way to the sink node. The existing paths may traverse only the output stage 2346H if there is a direct path between the source shell node and the sink node selected to complete the connection to the sink edge node. The number of matching time slots in existing paths to the sink node is then determined (step 2520). The paths of the route set are considered according to a predetermined order of preference and the nearest path, in an ordered list of paths, having a sufficient number of matching time slots is selected. Note that the "nearest path" is considered to be the highest ranking path in the predetermined order of preference. Each path in a route set is defined by one of the core nodes and each path may have several wavelength channels connecting the source edge node to the core node.

If none of the wavelength channels of a path under consideration has a sufficient number of matching time slots, i.e., time slots that are free in inlet ports of the source shell node connecting to the source edge node by a WDM link coinciding with time slots that are free in outbound ports of the source shell node connecting to a WDM link to the core node defining the path under consideration, another path through another core node may be considered. If none of the paths can accommodate the required number of time slots, the connection request is rejected (step 2540).

Where it is determined (in step 2524) that there is sufficient free capacity in an existing path to satisfy the requested capacity of the connection request, time slots may be reserved (step 2528) in the TDM frames that are sent by the source shell node to the sink node, via the core node 2362 and the output stage 2346H. Once the time slots are reserved, an allocation table maintained by the admission controller may be updated (step 2550) to reflect the reservation.

Figure 26:
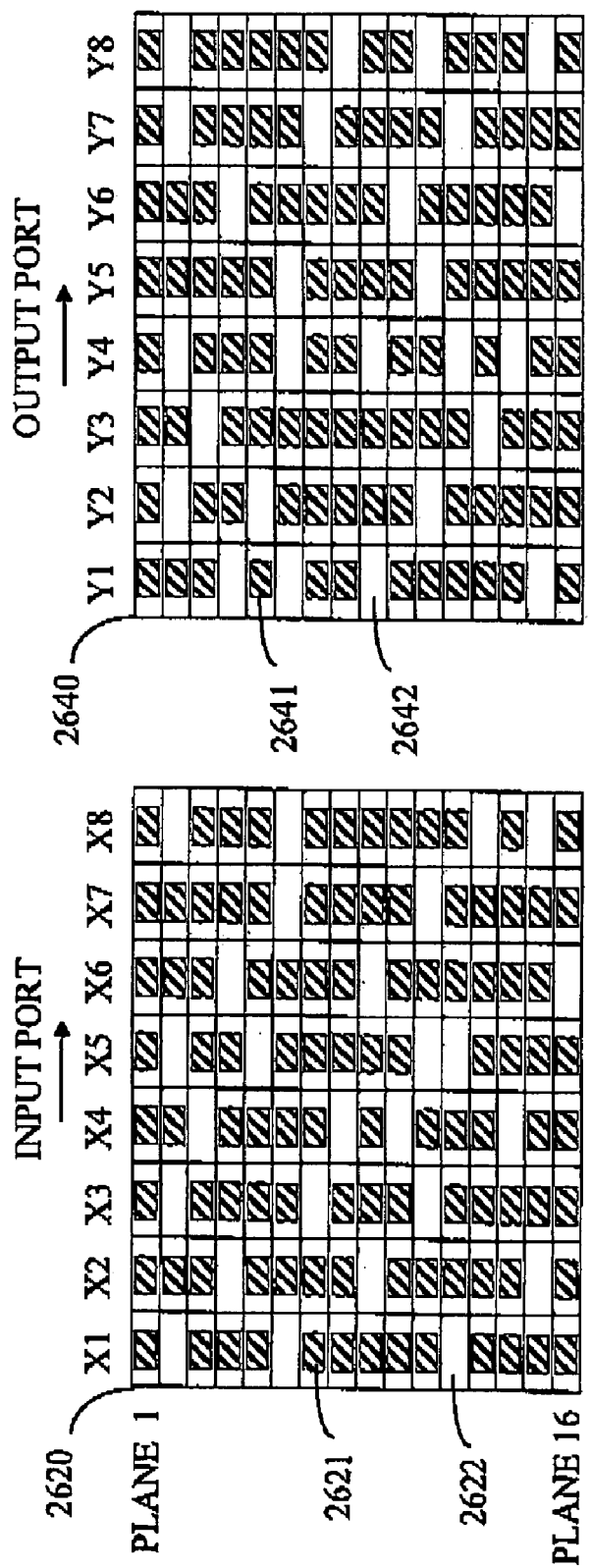
FIG. 26 illustrates allocation tables for a random allocation of connections in an optical core node according to an embodiment of the present invention.

FIG. 26 illustrates, for an optical core node, an input allocation table 2620 for the input ports of a parallel plane optical switch and an output allocation table 2640 for the output ports of the same parallel plane optical switch. As discussed hereinbefore, such a parallel plane optical switch may be used in a core node. The particular parallel plane optical switch to which the allocation tables 2620, 2640 relate has 16 switching planes, where each of the switching planes has eight input ports labeled X1, X2, X3, X4, X5, X6, X7, and X8 and eight output ports labeled Y1, Y2, Y3, Y4, Y5, Y6, Y7, and Y8. Availability of a given input port in the input allocation table 2620 is indicated by an empty table element 2622, where each table element is indexed by switching plane number along the vertical axis and by input port number along the horizontal axis. A given input port is indicated as occupied by a hashed table element 2621. Similarly, availability of a given output port in the output allocation table 2640 is indicated by an empty table element 2642 and a given output port is indicated as occupied by a hashed table element 2641. The parallel plane optical switch corresponding to the allocation tables 2620, 2640 of FIG. 26 is shown to be operating at about 80% capacity, where the allocation of a switching plane for a channel connection is performed in a random manner.

Figure 27:
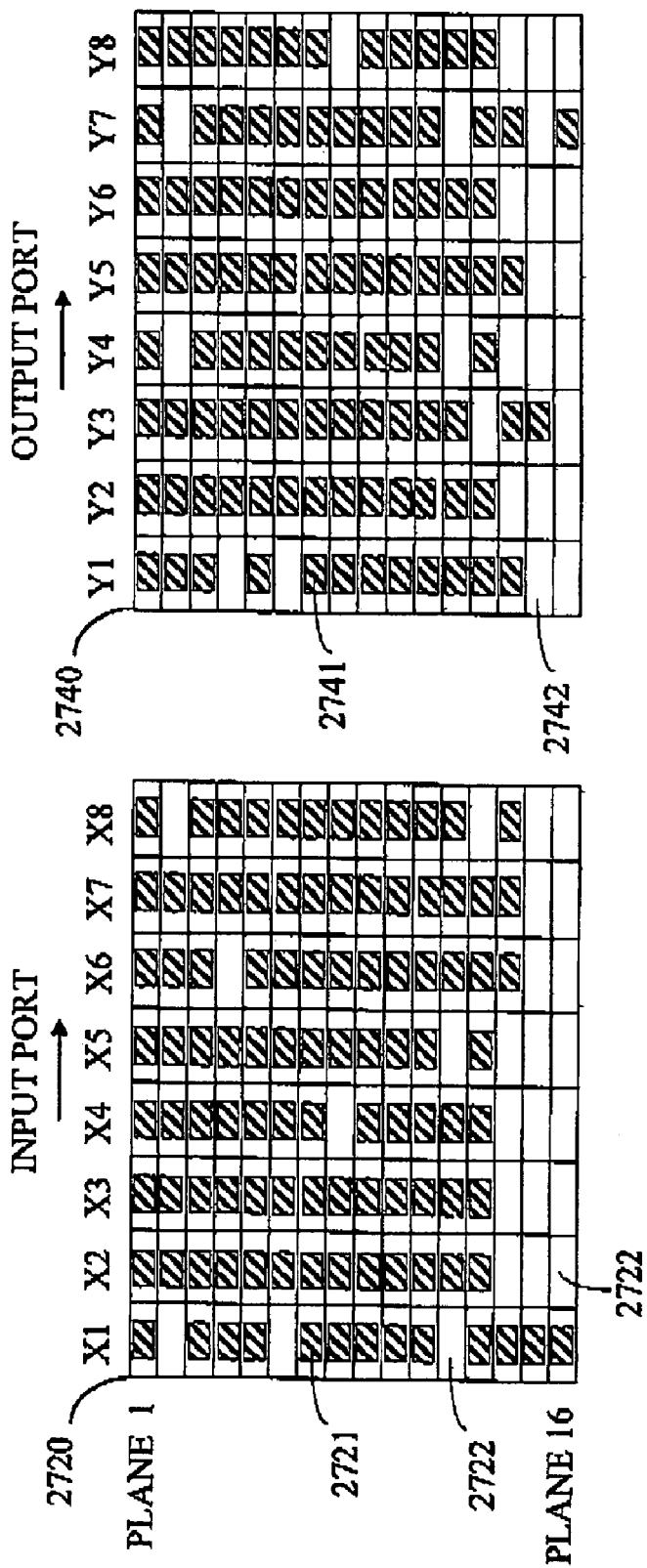
FIG. 27 illustrates allocation tables for a packed allocation of connections in an optical core node according to an embodiment of the present invention.

In contrast, FIG. 27 illustrates an input allocation table 1620 for the input ports of a parallel plane optical switch and an output allocation table 1640 for the output ports of the same parallel plane optical switch, where the allocation of ports is performed using "packing", where switching planes are examined in a predetermined order starting with a given reference plane; for example, starting with plane 1 and proceeding consecutively towards plane 16 for each channel-allocation attempt. As in the allocation tables 2620, 2640 of FIG. 26, the allocation tables 2720, 2740 of FIG. 27 indicate an available input port with an empty table element 2722, an occupied input port with a hashed table element 2721, an available output port with an empty table element 2742 and an occupied output port with a hashed table element 2741.

The act of packing involves selecting the lowest indexed switching plane of the switching planes available for allocation to a path to satisfy a given connection request. The result of such packing is evident in FIG. 27 when compared to FIG. 26. Both FIGS. 26 and 27 are representative of a parallel plane optical switch operating at 80% capacity, however, the occupancies of switching planes indexed as 1 to 16 decreases gradually as the plane index increases when packing is used, as illustrated in FIG. 27. As such, there is a greater likelihood of successful matching, i.e., finding an available input port and an available output port on the same plane. Consequently, there is a greater likelihood that the particular input port and the particular output port required to satisfy a channel switching request will be available. Note, for example, the $16^{th}$ plane, which, in FIG. 27, has seven available input ports and seven available output ports. In FIG. 26, the $16^{th}$ plane has one available input port and one available output port. The vacant elements are scattered so that each plane has a small number of vacant input ports and a small number of vacant output ports.

The selection of the lowest indexed available switching plane in response to a connection request can be termed as selecting the "minimum depth" switching plane. When requesting a new path for a connection (step 2532, FIG. 25), more than one paths may be requested. Where more than one path are found in response to such a request, a criterion should be in place to select one path over the others.

Figure 28:
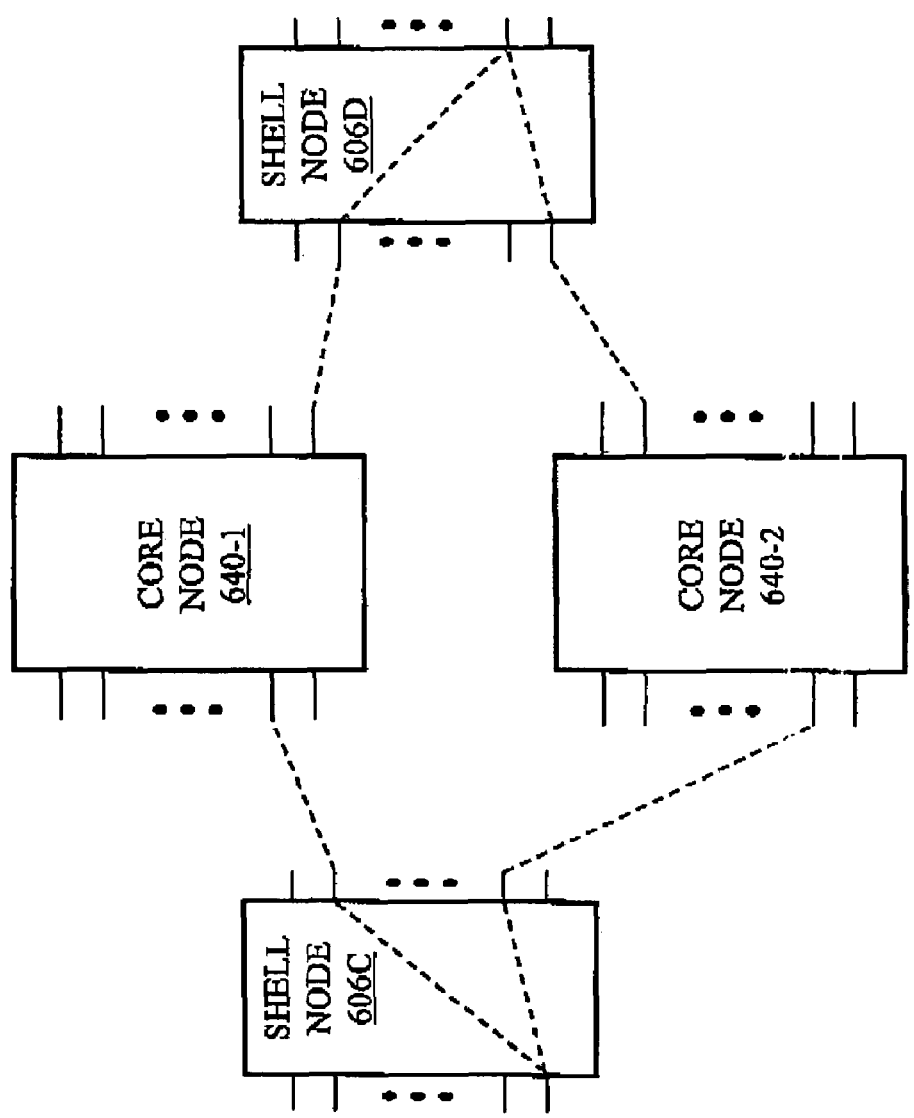
FIG. 28 illustrates two paths found through a multi-layer network in response to a connection request, the two path are

FIG. 28 illustrates a situation wherein two paths from an input fiber link of one shell node 606C to an output fiber link of another shell node 606D through an optical core node 640 have been found, where the optical core node 640 comprises parallel switching planes that are examined in a sequential order starting from a predefined reference switching plane. The depth of a channel path is defined as the deviation, i.e., the number of sequential steps, from the reference switching plane. One path is switched by a switching plane in a first core node 640-1 while the second is switched by a switching plane in a second core node 640-2. In one embodiment of an aspect of the present invention, the path associated with the switching plane having the minimum depth is selected. However, in another embodiment, a choice may be made between the two paths based upon a minimum static figure of merit such as end-to-end propagation delay. In a still further embodiment, a path may be selected based upon a composite criterion, wherein a weighted propagation delay is added to, or compounded with, the index of the switching plane.

Routing

If each edge node, 402 in network 400 or 602 in network 600, subtends to only one shell node, then any connection from a source edge node subtending to a first shell node to a sink edge node subtending to a second shell node is routed along one of the channel-switched paths connecting the first shell node to the second shell node. If any of the edge nodes subtends to more than one shell node, then a connection from a source edge node to a sink edge node may be routed through one of several shell-node pairs. The routes from a source edge node to a sink edge node may be sorted according to some merit criterion and a preferred route, based on merit, having a sufficient free capacity would be used to accommodate a connection request.

There are two distinct routing steps, for both network 400 of FIG. 4 and network 600 of FIG. 6. The first step is a coarse-switching step that establishes a channel connection for a pair of shell nodes based on the aggregate traffic they exchange among their subtending edge nodes. The second step is a fine-switching step that establishes a time-slotted connection from a source edge node to a sink edge node.

Figure 29:
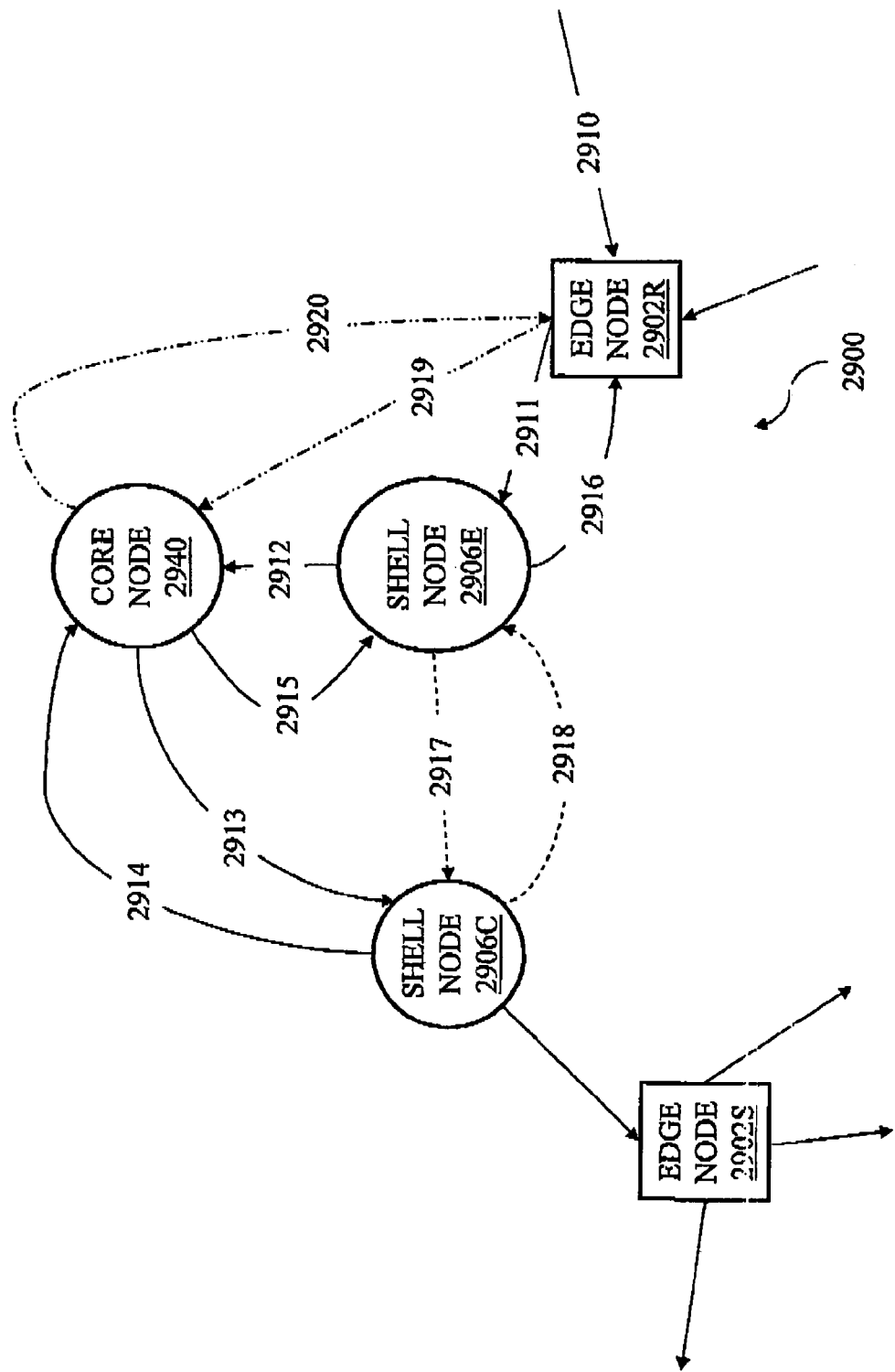
FIG. 29 illustrates signal flow in a simplified network to illustrate inter-node signaling according to an embodiment of the present invention.

FIG. 29 presents a simplified view of a network 2900 to illustrate the signaling aspect of the present invention that facilitates the hybrid fine-coarse carrier switching. A source node is part of a first edge node 2902R that is connected to, and time locked with, a first shell node 2906E. The first shell node 2906E can communicate with a second shell node 2906C through a core node 2940. The second shell node 2906C maintains a connection to a sink node that is part of a second edge node 2902S. Shell-node pair 2906E and 2906C can be one of many shell-node pairs that can be selected for a connection from source edge node 2902R to sink edge node 2902S.

FIRST EXAMPLE

In a first example, consider the network 2900 to be part of the network 600 of FIG. 6. Additionally, consider that the first edge node 2902R receives, and buffers, a traffic stream (step 2910) from a traffic source. As is typical, this traffic stream includes an indication of a traffic sink, which, for this example, is considered to be connected to the second edge node 2902S.

Coarse carrier switching

A controller of shell node 2906E determines the total volume of traffic originating from all its subtending edge nodes, including edge node 2902R, that choose to send traffic through shell node 2906E to all the sink edge nodes, including sink node 2906C, subtending to shell node 2906E. If the total traffic volume warrants, a channel-switched path from the shell node 2906E through core node 2940 and shell node 2906C is sought. The path may include more than one wavelength channel. The channel-switched path from shell node 2906E to shell node 2906C may then be shared by all edge nodes, including edge node 2902R, subtending to shell node 2906E and sending time-switched or channel-switched payload signals to any edge node subtending to shell node 2906C, including edge node 2902S. If the total traffic from edge nodes subtending to shell node 2906E to edge nodes subtending to shell node 2906C does not justify establishing a path, traffic from edge nodes subtending to shell node 2906E may be sent to other edge nodes subtending to shell nodes 2906 other than 2906E or 2906C, from which the traffic is consolidated with other traffic and routed to shell node 2906C.

To establish a path between the two shell nodes 2906E and 2906C, the first shell node 2906E sends a channel switching request (step 2912) to the core node 2940. The channel switching request specifies a predetermined number of channels on the fiber connecting the first shell node 2906E to the core node 2940 and also specifies shell node 2906C as a destination for the wavelength channels requested. The channel switching request must be transferred from the first shell node 2906E to the core node 2940 according to an out-of-band signaling scheme, where the core node 2940 has a structure as presented in FIG. 17, since the first shell node 2906E and the core node 2940 are unlikely to be time-locked, time-locking being a requirement for in-band signaling.

A controller of core node 2940 maintains a connectivity map indicating the free-busy state of its inbound channels, received from all its subtending shell nodes, including shell node 2906E, and all its outbound channels to all subtending shell nodes, including shell node 2906C. Core node 2940 preferably uses a parallel-plane switching fabric in order to realize a high capacity. A WDM link from shell node 2906E to core node 2940 has a number of wavelength channels each connecting to an input port of one of the parallel planes of the switching fabric. A WDM link from core node 2940 to shell node 2906C has an equal number of channels, each connecting to an output port of one of the switching planes of core node 2940. A switching plane is called a matching switching plane with respect to shell nodes 2906E and 2906C, respectively, if an input port receiving a wavelength channel from shell node 2906E is free and an output port sending a wavelength channel to shell node 2906C is also free. The core controller performs a channel matching process by examining all switching planes, as described with reference to FIG. 28, in order to find a number of matching switching planes, equal to the required number of channels for the required channel connection from shell node 2906E to shell node 2906C. The core node controller need not communicate with shell node 2906C to determine the availability of matching switching planes because the core node controller maintains an input-output state map of all its inbound and outbound wavelength channels on all of its switching planes. The controller of core node 2940 sends channel switching permit to the first shell node 2906E (step 2915) including information identifying the channels constituting the path from shell node 2906E to shell node 2906C.

Having established the inter-shell-node channel connection, the shell controller (not shown) at the second shell node 2906C arranges for channel switching the channels of a path from edge node 2902R to the second edge node 2902S. Signals may be exchanged between the controller of core node 2940 and the controller of shell node 2960C to confirm channel assignments and for routine maintenance purposes (steps 2913 and 2914).

Fine Carrier Switching

The first edge node 2902R considers the traffic sink, in light of traffic sinks of other traffic streams received at the first edge node 2902R, and determines a volume of traffic that is to be transferred to traffic sinks that are connected to the second edge node 2902S.

As described earlier, an edge node may comprise two nodes; a source node and a sink node and the two nodes may be combined to share memory and control. Reference to a source node is understood to imply the associated edge node and, likewise, reference to a sink node is understood to imply its associated edge node. The source node that is part of the first edge node 2902R sends a time switching request (step 2911) to the first shell node 2906E. The time switching request specifies a number of time slots, in the TDM frame used for communication from the first edge node 2902R to the first shell node 2906E, that will accommodate the volume of traffic determined to be destined for the second edge node 2902S. The time switching request may be transferred from the first edge node 2902R to the first shell node 2906E as in-band signaling, where the first shell node 2906E has a structure as presented in FIG. 16, or as out-of-band signaling, where the first shell node 2906E has a structure as presented in FIG. 15. Only one of the wavelength channels in a WDM link connecting edge node 2902R need carry signaling data and, preferably, at least one of the wavelength channels in the WDM links is operated in a time sharing mode and using in-band signaling.

The first shell node 2906E consults a routing table maintained in local memory (not shown) to determine that the second edge node 2902S is connected to the second shell node 2906C. The first shell node 2906E also determines that a route the second shell node 2906C can be obtained through the core node 2940, among other, non-illustrated, core nodes.

The shell controller (not shown) at the first shell node 2906E arranges for time switching designated time slots in TDM frames received from the source edge node to the output port of the shell node 2906E at which a signal will be formed and sent on a channel allocated to the core node 2940. The shell controller then sends a connection schedule (step 2916) to the first edge node 2902R indicating the designated time slots in which to send traffic destined for the second edge node 2902S.

Once the first edge node 2902R has received the time switching assignment, edge node 2902R may begin sending the traffic destined for the second edge node 2902S in the designated time slots. The time slots from the source node are switched, with other non-coincident time slots from other source edge nodes subtending to shell node 2906E, toward an outbound port of shell node 2906E at which a signal is formed and sent to the core node 2940 on the predetermined channel. Upon reaching the core node 2940, the signal is channel switched to the second shell node 2906C. Upon reaching the second shell node 2906C, the signal is channel switched to the sink node at the second edge node 2902S. At the second edge node 2902S, the received signal may be buffered and the traffic streams in the different time slots may be directed to respective egress ports of edge node 2902S to be delivered to traffic sinks by the second edge node 2902S.

SECOND EXAMPLE

Coarse Carrier Switching

For a second example, consider the network 2900 to be part of the network 400 of FIG. 4, wherein there are no core nodes, or part of the network 1300 of FIG. 13, wherein direct connections between shell nodes are allowed, even in the presence of core nodes. The receipt of a traffic stream from a traffic source (step 2910) and the creation and sending of a time switching request (step 2911) to the first shell node 2906E occur as presented hereinbefore in the first example.

A controller of shell node 2906E has a connectivity map indicating the free-busy state of each of the input and output ports of shell node 2906E during each time slot in a predefined TDM frame. Based on the traffic volume from all edge nodes subtending to shell node 2906E and choosing a direct path to route payload signals to edge nodes subtending to shell node 2906C, the controller of shell node 2906E determines an adequate number of channels in a WDM link connecting shell node 2906E to shell node 2906C that would be destined to candidate edge nodes subtending to shell node 2906C. If there is insufficient payload traffic destined to edge node 2902S to occupy a wavelength channel, traffic destined to other edge nodes subtending to shell node 2906C may be aggregated with other traffic destined to edge node 2902S and directed to edge node 2902S which would then switch traffic through shell node 2906C to respective sink edge nodes.

In the absence of a core node 2940, or, in order to avoid an extra switching step where a direct connection is available, the first shell node 2906E sends a channel switching request (step 2917) to the second shell node 2906C. The channel switching request specifies a required number of channels on the fiber connecting the first shell node 2906E to the second shell node 2906C and may also specify the second edge node 2902S as a destination for the signal to be switched. The channel switching request must be transferred from the first shell node 2906E to the second shell node 2906C as out-of-band signaling, where the second shell node 2906C has a structure as presented in FIG. 15, since the first shell node 2906E and the second shell node 2906C are unlikely to be time-locked, a requirement for in-band signaling.

The shell controller (not shown) at the second shell node 2906C arranges for channel switching the channel on which the signal to be switched will arrive to a channel on the fiber link to the second edge node 2902S. Having made such an arrangement, the second shell node 2906C sends a channel switching permit (step 2918) to the first shell node 2906E. The channel switching permit acknowledges the channel switching request and confirms that the requested channel switching has been arranged.

Fine Carrier Switching

Time switching in shell node 2906E occurs in the same manner as described with respect to the first example. Subsequent signaling between the first shell node 2906E and the first edge node 2902R then occurs as outlined above in the first example, specifically regarding step 2916, wherein the first shell node 2906E sends a connection schedule to the first edge node 2902R.

Once the first edge node 2902R has received the time switching assignment, the source node may begin sending the traffic destined for the second edge node 2902S in the designated time slots. The time slots from the source node are switched, with other non-coincident time slots from other source nodes, toward an outbound port of shell node 2906E at which a signal is formed and sent to the second shell node 2906C on the predetermined channel. Upon reaching the second shell node 2906C, the signal is channel switched to the sink node at the second edge node 2902S. At the second edge node 2902S, the received signal may be buffered and the traffic streams in the different time slots may be sent to the determined traffic sinks by the second edge node 2902S.

THIRD EXAMPLE

For a third example, consider that a direct connection exists between the first edge node 2902R and the core node 2940. Further consider that the first edge node 2902R is time locked to the core node 2940. The receipt of a traffic stream from a traffic source (step 2910) occurs as presented hereinbefore in the first example.

A time-switched connection from the first edge node 2902R to another edge node likewise connected directly to core node 2940 is feasible if core node 2940 employs a fast-switching fabric. Time-switched connections from all edge nodes subtending directly to core node 2940 can be interleaved at output ports of the core node 2940 to occupy full wavelength channels that can be switched to any edge node subtending to any of the shell nodes that connect to core node 2940.

The first edge node 2902R, connected directly to core node 2940, considers the traffic sink, in light of traffic sinks of other traffic streams received at the first edge node 2902R, and determines a volume of traffic that is to be transferred to traffic sinks that are connected to the second edge node 2902S.

The source node that is part of the first edge node 2902R sends a time switching request (step 2919) to the core node 2940. The time switching request specifies a number of time slots, in the TDM frame used for communication from the first edge node 2902R to the core node 2940, that will accommodate the volume of traffic determined to be destined for the second edge node 2902S. The time switching request may be transferred from the first edge node 2902R to the core node 2940 as in-band signaling, where the core node 2940 has a structure as presented in FIG. 18, or as out-of-band signaling, where the core node 2940 has a structure as presented in FIG. 17.

Channel allocation within core node 2940 occurs in a manner similar to that outlined above in the first example.

The core node 2940 receives similar requests for time-switched connections to edge node 2902S from other directly subtending edge nodes and sends a channel switching request to the second shell node 2906C and the second shell node 2906C responds with a rejection or a channel switching permit. Rejection occurs when all output ports of shell node 2906C leading to edge node 2902S are occupied. With appropriate admission control, the probability of rejection can be made negligibly small.

The core controller (not shown) arranges for time switching designated time slots in TDM frames received from the source edge node 2902R to the output port of core node 2940 at which a signal will be formed and sent on the channel allocated to the second shell node 2906C. The core controller then sends a time switching schedule (step 2920) to the first edge node 2902R indicating the designated time slots in which to send traffic destined for the second edge node 2902S.

Once the first edge node 2902R has received the time switching schedule, the source node may begin sending the traffic destined for the second edge node 2902S in the designated time slots. The time slots from the source node are switched, together with other non-coincident time slots from other source nodes, toward an outbound port of the core node 2940 at which a signal is formed and sent to the second shell node 2906C on the predetermined channel. Upon reaching the second shell node 2906C, the signal is channel switched to the sink node of the second edge node 2902S. At the second edge node 2902S, the received signal may be buffered, after optical-to-electrical conversion, and the traffic streams in the different time slots are sent to respective traffic sinks by the second edge node 2902S.

The invention, therefore, facilitates the construction of a scalable dynamic network based on an optical core of two layers; an outer fast-switching optical layer, and an inner optical switching layer that need not be fast switching.

Other modifications will be apparent to those skilled in the art and, therefore, the invention is defined in the claims.

I claim:

1. A lattice network comprising:
   a plurality of optical shell nodes logically arranged in at least two primary networks, each said primary network having at least two optical shell nodes interconnected by
      at least one primary optical core node; and
      links from said at least two optical shell nodes to said at least one primary optical core node;
   where said optical shell nodes are further logically arranged in at least two secondary networks, each said secondary network having an interconnection means for interconnecting selected optical shell nodes, said selected optical shell nodes including one of said at least two optical shell nodes from each of said at least two primary networks;
   a plurality of shell controllers, each shell controller associated with an optical shell node; and
   a plurality of edge nodes, each edge node subtending to at least one of said plurality of optical shell nodes, said each edge node having an edge controller exchanging time-locking signals with a shell controller of each of said at least one of said plurality of optical shell nodes
   wherein each of said at least one primary optical core node comprises parallel switch planes and each of said at least two optical shell nodes connects to each switch plane of said parallel switch planes.

2. The lattice network of claim 1 wherein said interconnection means comprises direct wavelength-division-multiplexed links.

3. The lattice network of claim 1 wherein said interconnection means comprises:
at least one secondary optical core node; and
links from said selected optical shell nodes to said at least one secondary optical core node.

4. The lattice network of claim 3 wherein each of said at least one secondary optical core node comprises parallel switch planes and each of said selected optical shell nodes connects to each switch plane of said parallel switch planes.

5. The lattice network of claim 3 further comprising a core controller of each secondary core node of said at least one secondary optical core node, said core controller maintaining a connectivity map indicating free-busy state of channels from said selected optical shell nodes to said each secondary core node and free-busy state of channels from said each secondary core node to said selected optical shell nodes.

6. The lattice network of claim 3 wherein at least one optical core node of said at least one primary optical core node is a time-switching node and at least one edge node of said plurality of edge nodes subtends to said at least one optical core node and subtends to said at least one of said plurality of optical shell nodes.

7. The lattice network of claim 1 wherein said each edge node transmits time-slotted carrier signals destined for other edge nodes.

8. The lattice network of claim 1 wherein any two of said plurality of optical shell nodes exchange carrier signals at wavelength-channel granularity.

9. The lattice network of claim 1 wherein:
aggregate time-slotted carrier signals transmitted by a first edge node subtending to a first shell node and destined for destination edge nodes subtending to a second shell node are carried by a wavelength channel to a selected one of said destination edge nodes; and
said selected one of said destination edge nodes transmits individual time-slotted signals destined for other destination edge nodes subtending to said second optical shell node.

10. The lattice network of claim 9 wherein said selected one of said destination edge nodes is the one of said destination edge nodes for which the highest proportion of said aggregate time-slotted carrier signals is destined.

11. The lattice network of claim 1 wherein each optical shell node of said plurality of optical shell nodes is a single-plane fast-switching node.

12. The lattice network of claim 11 wherein time-slotted signals from a first edge node connecting to a first optical shell node and destined to a second edge node connecting to said first optical shell node are time-switched through said first optical shell node.

13. The lattice network of claim 11 wherein time-slotted signals from at least two edge nodes connecting to a first optical shell node and destined to a specific edge node connecting to a second optical shell node are time-switched through said first optical shell node to an output channel leading to said second optical shell node and channel-switched through said second optical shell node to said specific edge node.

14. The lattice network of claim 1 wherein a shell controller associated with each optical shell node maintains a connectivity map indicating a free-busy state of each of input ports and each of output ports of said each optical shell node during each time slot in a predefined TDM frame.

15. A lattice network comprising
a plurality of optical shell nodes logically arranged in at least two primary networks, each said primary network having at least two optical shell nodes interconnected by:
at least one primary optical core node; and
links from said at least two optical shell nodes to said at least one primary optical core node;
where said optical shell nodes are further logically arranged in at least two secondary networks, each said secondary network having an interconnection means for interconnecting selected optical shell nodes, said selected optical shell nodes including one of said at least two optical shell nodes from each of said at least two primary networks;
a plurality of shell controllers, each shell controller associated with an optical shell node;
a plurality of edge nodes, each edge node subtending to at least one of said plurality of optical shell nodes, said each edge node having an edge controller exchanging time-locking signals with a shell controller of each of said at least one of said plurality of optical shell nodes; and
a core controller of each primary core node of said at least one primary optical core node, said core controller maintaining a connectivity map indicating free-busy state of channels from said at least two optical shell nodes to said each primary core node and free-busy state of channels from said each primary core node to said at least two optical shell nodes.

16. A lattice network comprising:
a plurality of optical shell nodes logically arranged in at least two primary networks, each said primary network having at least two optical shell nodes interconnected by:
at least one primary optical core node; and
links from said at least two optical shell nodes to said at least one primary optical core node;
where said optical shell nodes are further logically arranged in at least two secondary networks, each said secondary network having an interconnection
means for interconnecting selected optical shell nodes, said selected optical shell nodes including one of said at least two optical shell nodes from each of said at least two primary networks;
a plurality of shell controllers, each shell controller associated with an optical shell node; and
a plurality of edge nodes, each edge node subtending to at least one of said plurality of optical shell nodes, said each edge node having an edge controller exchanging time-locking signals with a shell controller of each of said at least one of said plurality of optical shell nodes;
wherein each said primary optical core node is a channel-switching node.

17. The lattice network of claim 16 wherein said interconnection means comprises:
at least one secondary optical core node; and
links from said selected optical shell nodes to said at least one secondary optical core node;
wherein each said secondary optical core node is a channel-switching node.

* * * * *